(12) United States Patent
She et al.

(10) Patent No.: US 10,419,293 B1
(45) Date of Patent: Sep. 17, 2019

(54) FAST REFORMATION IN A DIRECTED ACYCLIC GRAPH BASED ON DEFERRED CONTENTION TO HIGHER DEVICES

(71) Applicant: Cisco Technology, Inc., San Jose, CA (US)

(72) Inventors: Huimin She, Shanghai (CN); Jianzhou Chen, Nanjing (CN); Chuanwei Li, Shanghai (CN); Pascal Thubert, La Colle sur Loup (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/004,245

(22) Filed: Jun. 8, 2018

(51) Int. Cl.
  *H04L 12/24* (2006.01)
  *H04L 12/759* (2013.01)
  *H04L 12/753* (2013.01)

(52) U.S. Cl.
  CPC .......... *H04L 41/12* (2013.01); *H04L 41/0816* (2013.01); *H04L 45/028* (2013.01); *H04L 45/48* (2013.01)

(58) Field of Classification Search
  CPC ... H04L 41/12; H04L 41/0816; H04L 45/028; H04L 45/48
  See application file for complete search history.

(56) References Cited

U.S. PATENT DOCUMENTS

| | | | |
|---|---|---|---|
| 8,472,348 B2 | 6/2013 | Hui et al. | |
| 8,787,392 B2 * | 7/2014 | Vasseur | H04L 45/028 370/400 |
| 9,081,567 B1 * | 7/2015 | Mahamuni | G06F 1/3206 |
| 9,641,382 B2 | 5/2017 | Hui et al. | |
| 9,647,494 B2 | 5/2017 | Hui et al. | |
| 9,785,509 B2 | 10/2017 | Hui et al. | |
| 9,893,985 B2 | 2/2018 | Hui et al. | |

(Continued)

OTHER PUBLICATIONS

Thubert et al., "IETF 6TSCH: Combining IPv6 Connectivity with Industrial Performance" [online], Jul. 2013, [retrieved on Nov. 9, 2017]. Retrieved from the Internet: <URL: https://www.researchgate.net/profile/Pascal_Thubert/publication/261430569_IETF_6TSCH_Combining_IPv6_Connectivity_with_Industrial_Performance/links/56c4887c08ae7fd4625a28c8/IETF-6TSCH-Combining-IPv6-Connectivity-with-Industrial-Performance.pdf?origin=publication_detail>, pp. 1-7.

(Continued)

*Primary Examiner* — Mehmood B. Khan
(74) *Attorney, Agent, or Firm* — Leon R. Turkevich

(57) ABSTRACT

A network device stores in its nonvolatile memory, in response to detecting a power outage in a tree-based network, an identifier for a preferred parent and a distance identifier for the network device within the network. In response to power restoration, the network device starts a trickle timer based on the ring identifier, for determining whether a beacon request from a transmitting node and destined for the preferred parent is detected during the waiting interval. In response to the network device detecting the beacon request during the waiting interval, the network device sets its channel hopping schedule to the corresponding channel hopping schedule of the transmitting node in response to determining the beacon request is destined for the preferred parent, enabling rejoining with the preferred parent in response to detecting a beacon from the preferred parent to the transmitting node via the corresponding channel hopping schedule of the transmitting node.

20 Claims, 18 Drawing Sheets

(56) References Cited

U.S. PATENT DOCUMENTS

| | | | |
|---|---|---|---|
| 2008/0003951 A1* | 1/2008 | Kuwahara | A63F 13/12 455/73 |
| 2009/0161581 A1 | 6/2009 | Kim | |
| 2012/0155475 A1* | 6/2012 | Vasseur | H04L 45/028 370/400 |
| 2012/0324273 A1 | 12/2012 | Shaffer et al. | |
| 2014/0226667 A1 | 8/2014 | Veillette | |
| 2015/0188934 A1* | 7/2015 | Vasseur | H04L 63/1416 726/23 |
| 2015/0188935 A1* | 7/2015 | Vasseur | H04L 63/1416 726/23 |
| 2015/0193694 A1* | 7/2015 | Vasseur | H04L 41/16 706/12 |
| 2015/0193695 A1* | 7/2015 | Cruz Mota | G06N 3/08 706/12 |
| 2015/0195216 A1* | 7/2015 | Di Pietro | H04L 41/5025 370/252 |
| 2015/0195296 A1* | 7/2015 | Vasseur | H04L 43/0876 726/23 |
| 2016/0020997 A1* | 1/2016 | Hui | H04B 1/713 370/225 |
| 2016/0021647 A1* | 1/2016 | Hui | H04B 1/713 370/335 |
| 2016/0043942 A1* | 2/2016 | Purohit | H04W 40/244 370/338 |
| 2016/0212698 A1* | 7/2016 | Guo | H04W 52/0203 |
| 2016/0219415 A1* | 7/2016 | Purohit | H04W 4/06 |
| 2017/0223700 A1 | 8/2017 | Thubert et al. | |
| 2017/0264532 A1* | 9/2017 | Guo | H04L 45/16 |

OTHER PUBLICATIONS

Cisco Systems, Inc., "Cisco Connected Grid WPAN Module for CGR 1000 Series Installation and CG-Mesh Configuration Guide", [online], Jun. 2017, [retrieved on Apr. 4, 2018]. Retrieved from the Internet: URL: <https://www.cisco.com/c/en/us/td/docs/routers/connectedgrid/modules/wpan/release_5-0/Cisco_Connected_Grid_WPAN_Module_for_CGR_1000_Series_Installition_and_CG-Mesh_Configuration_Guide.pdf>, pp. 1-52.

Vasseur et al., "RPL: The IP routing protocol designed for low power and lossy networks", [online], Internet Protocol for Smart Objects (IPSO) Alliance, Apr. 2011, [retrieved on Mar. 1, 2018]. Retrieved from the Internet: URL: <http://www.ipso-alliance.org/wp-content/media/rpl.pdf>, pp. 1-20.

"Cisco Connected Grid WPAN Module for CGR 1000 Series Installation and Cisco Resilient Mesh Configuration Guide (Cisco IOS)", [online], [retrieved on May 21, 2018]. Retrieved from the Internet: URL: <https://www.cisco.com/c/en/us/td/docs/routers/connectedgrid/cgr1000/ios/modules/wpan_cgmesh/b_wpan_cgmesh_IOS_cfg/wpan_cgmesg_IOS_cfg.pdf>, pp. 1-78.

Levis et al., "The Trickle Algorithm", Internet Engineering Task Force (IETF), Request for Comments: 6206, Mar. 2011, pp. 1-13.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Thubert, Ed., "Objective Function Zero for the Routing Protocol for Low-Power and Lossy Networks (RPL)", Internet Engineering Task Force (IETF), Request for Comments: 6552, Mar. 2012, pp. 1-14.

Thubert et al., U.S. Appl. No. 15/954,786, filed Apr. 17, 2018.
Thubert et al., U.S. Appl. No. 15/902,028, filed Feb. 22, 2018.
Thubert et al., U.S. Appl. No. 15/446,705, filed Mar. 8, 2017.

* cited by examiner

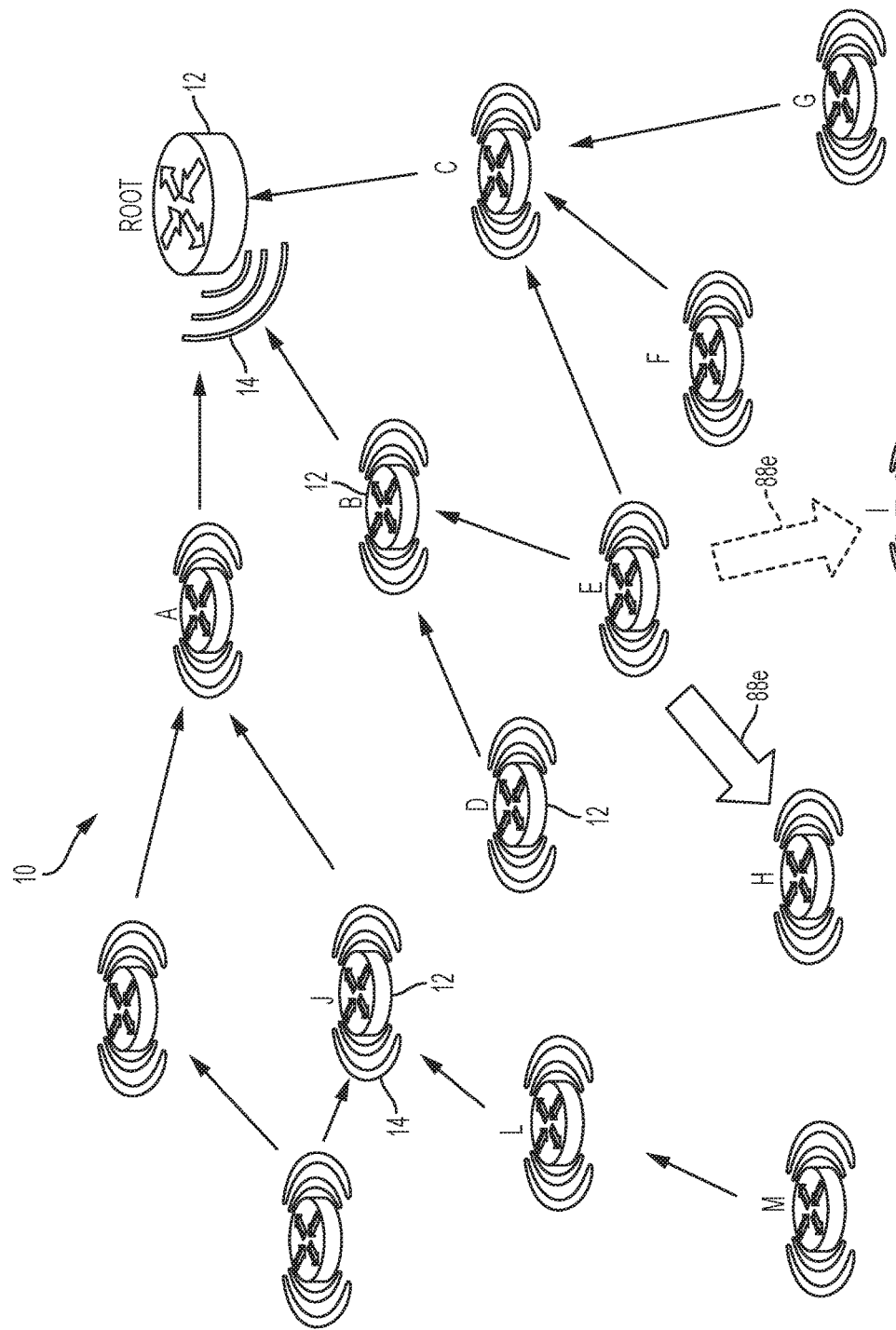

FAST REFORMATION IN A DIRECTED ACYCLIC GRAPH BASED ON DEFERRED CONTENTION TO HIGHER DEVICES

TECHNICAL FIELD

The present disclosure generally relates to fast reformation in a directed acyclic graph based on deferred contention to higher devices.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The DODAG can be formed based on a DODAG information object (DIO) advertised by the DAG root, where a "child" network device detecting the DIO can select the DAG root as a parent in the identified DODAG based on comparing network topology metrics (advertised in the DIO) to a prescribed objective function of the RPL instance. The "child" network device, upon attaching to its parent, can output its own DIO with updated network topology metrics that enable other network devices to discover the DODAG, learn the updated network topology metrics, and select a DODAG parent.

Any RPL node that is "powered up" first must join a network at the link layer to establish a link layer connection within the network, for example a link layer mesh network: after joining the network at the link layer, a RPL node can potentially output one or more network-layer DODAG Information Solicitation (DIS) messages as a probe for nearby DODAGs. Any RPL node that is "powered up" also can potentially advertise itself as a root of a "floating" DODAG based on outputting its own DIO specifying the advertised DODAG is floating.

BRIEF DESCRIPTION OF THE DRAWINGS

Reference is made to the attached drawings, wherein elements having the same reference numeral designations represent like elements throughout and wherein:

FIGS. 6A-6G illustrates an example variation of the data network of FIG. 1A and having RPL network devices for executing fast reformation based on the deferred contention to the higher devices, according to an example embodiment.

DESCRIPTION OF EXAMPLE EMBODIMENTS

Overview

Figure 1A:
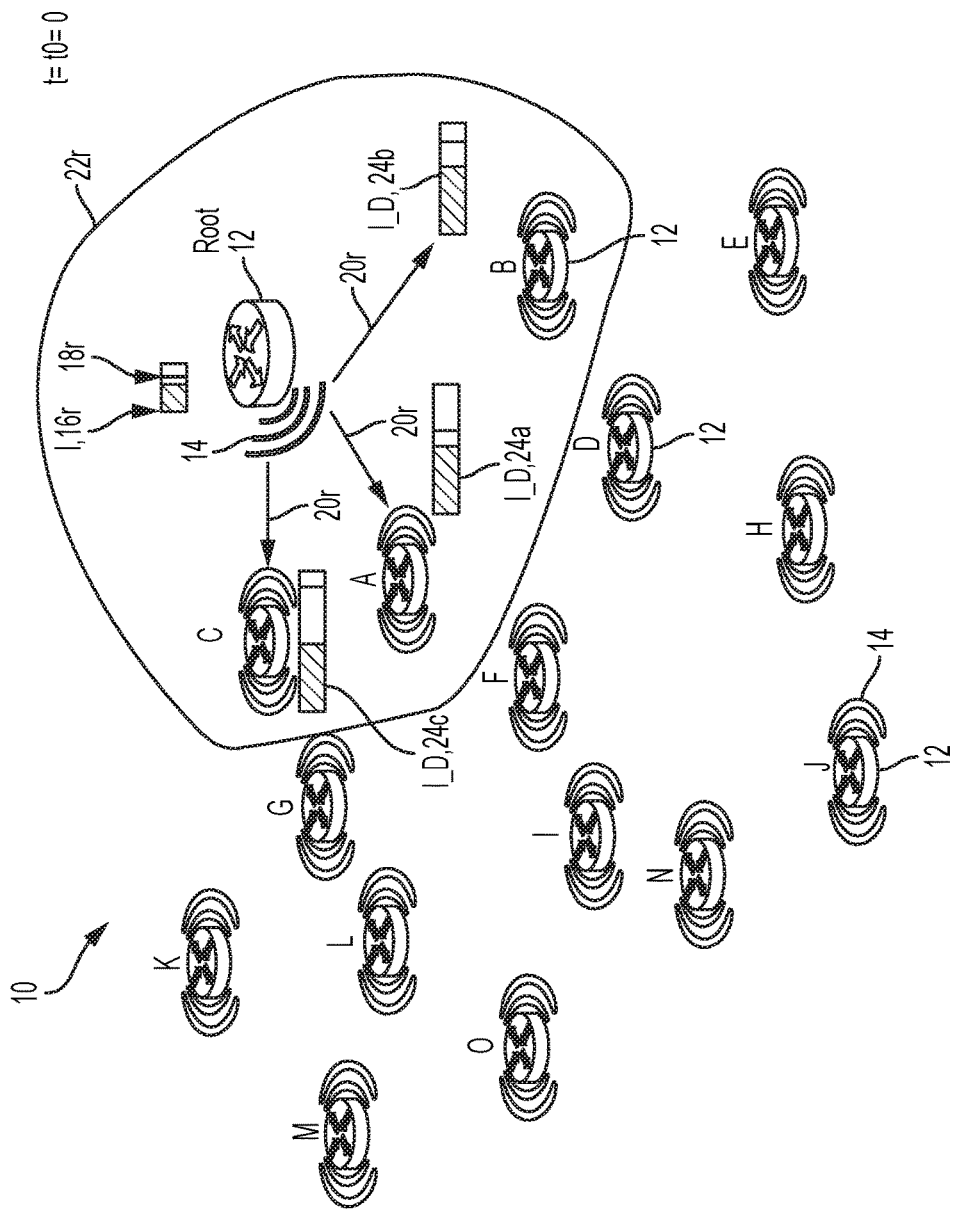
FIGS. 1A-1E illustrates an example data network having RPL network devices for executing deferred transmission operations that defer to prescribed transmission operations by higher devices that are closer to a RPL root, according to an example embodiment.

In one embodiment, a method comprises storing in a nonvolatile memory, by a network device in response to detecting a power outage in a tree-based network, an identifier for a preferred parent and distance identifier for the network device relative to a root within the tree-based network; starting by the network device, in response to power restoration in the tree-based network, a waiting interval for detecting activity associated with the preferred parent, including starting a trickle timer having a duration based on the distance identifier, and determining whether a beacon request from a transmitting node and destined for the preferred parent is detected during the waiting interval. In response to the network device detecting the beacon request during the waiting interval, the method also can include: selectively setting a channel hopping schedule of the network device to the corresponding channel hopping schedule of the transmitting node in response to determining a destination of the beacon request corresponds to the preferred parent; detecting a beacon unicast transmitted from the preferred parent to the transmitting node via the corresponding channel hopping schedule of the transmitting node, the beacon including network configuration information for rejoining the tree-based network following the power restoration; and rejoining the preferred parent in the tree-based network based on the configuration information sent to the transmitting node.

In another embodiment, an apparatus comprises a device interface circuit, a nonvolatile memory circuit, and a processor circuit. The processor circuit is configured for storing in the nonvolatile memory circuit, in response to detecting a power outage in a tree-based network, an identifier for a preferred parent and distance identifier for the apparatus relative to a root within the tree-based network. The processor circuit also configured for starting, in response to power restoration in the tree-based network, a waiting interval for detecting activity associated with the preferred parent, including starting a trickle timer having a duration based on the distance identifier, the processor circuit configured for determining whether a beacon request from a transmitting node and destined for the preferred parent is detected during the waiting interval. The processor circuit further is configured for responding to detecting the beacon request during the waiting interval by: selectively setting a channel hopping schedule of the device interface circuit to the corresponding channel hopping schedule of the transmitting node in response to determining a destination of the beacon request corresponds to the preferred parent, determining whether a beacon unicast transmitted from the preferred parent to the transmitting node is detected via the corresponding channel hopping schedule of the transmitting node, the beacon including network configuration information for rejoining the tree-based network following the power restoration, and the processor circuit configured for rejoining the preferred parent in the tree-based network based on the configuration information sent to the transmitting node.

In another embodiment, one or more non-transitory tangible media are encoded with logic for execution by a machine and when executed by the machine operable for: storing in a nonvolatile memory, by the machine implemented as a network device in a data network, in response to detecting a power outage in a tree-based network, an identifier for a preferred parent and distance identifier for the network device relative to a root within the tree-based network; starting by the network device, in response to power restoration in the tree-based network, a waiting interval for detecting activity associated with the preferred parent, including starting a trickle timer having a duration based on the distance identifier, and determining whether a beacon request from a transmitting node and destined for the preferred parent is detected during the waiting interval. In response to the network device detecting the beacon request during the waiting interval, when media executed the machine is further operable for: selectively setting a channel hopping schedule of the network device to the corresponding channel hopping schedule of the transmitting node in response to determining a destination of the beacon request corresponds to the preferred parent, detecting a beacon unicast transmitted from the preferred parent to the transmitting node via the corresponding channel hopping schedule of the transmitting node, the beacon including network configuration information for rejoining the tree-based network following the power restoration, and rejoining the preferred parent in the tree-based network based on the configuration information sent to the transmitting node.

DETAILED DESCRIPTION

Particular embodiments enable network devices to respond to a power restoration event in a data network by establishing a fast reformation of link-layer and network-layer connections in the data network, enabling fast reformation of a network-layer tree-based network topology based on the network devices deferring to higher network devices, and the network devices determining whether reattachments can be made based on detecting beacon requests from neighbor devices and corresponding configuration beacons unicast transmitted in response to the beacon requests.

In particular, example embodiments can cause network devices in a data network to defer to higher network devices that are closer to a root of a DAG network topology in a data network, based on causing the network devices to execute a deferred transmission operation that defers (i.e., grants a higher priority) to the higher network devices in the DAG network topology. The deferred transmission operation defers to the higher devices that are executing a prescribed transmission operation, for example a prescribed discovery operation comprising attempted transmission of link layer beacon request messages and/or discovery information messages (e.g., DIO messages) at a randomized position after a selected minimum contention interval, for example according to the Trickle Algorithm specified under the Internet Engineering Task Force (IETF) Request for Comments (RFC) 6206 and according to the RPL protocol as specified in RFC 6550.

The particular embodiments can exploit the deferred contention to higher devices by utilizing link layer beacon request messages detected during the selected minimum contention interval. For example, a network device that is waiting during its selected minimum contention interval can detect a beacon request from a neighboring network device ("transmitting network device" or "requesting device") that is sending its beacon request to a parent device. The data network can utilize a channel hopping protocol where each network device in the data network can establish a corresponding prescribed channel hopping schedule, for example based on a link layer address (e.g., EUI-64) of the network device: in response to the network device detecting that the beacon request is destined for the preferred parent of the network device, the network device can set and synchronize its channel hopping schedule to match the corresponding channel hopping schedule of the requesting network device. Hence, the network device, having synchronized to the channel hopping schedule of the requesting network device, can detect the preferred parent unicast transmitting a configuration beacon message in response to the beacon request (from the requesting device); consequently, the network device can rejoin the preferred parent in the tree-based network based on network configuration information in the received configuration beacon message, without the necessity of the network device transmitting any messages.

Hence, the example embodiments enable fast reformation of a directed acyclic graph in the data network in a manner that eliminates the necessity of every network device transmitting link layer or network layer messages, rather network devices can rely on beacon transmission from neighboring devices for rejoining into the directed acyclic graph.

A description will first be provided of deferred contention to higher devices based on a network device starting a trickle timer based on a distance identifier for the network device (e.g., a "ring" identifier), followed by a description of the fast reformation based on synchronizing to the corresponding channel hopping schedule of a neighboring requesting device, and rejoining a preferred parent based on obtaining configuration information having been obtained by detecting a configuration beacon unicast transmitted by the preferred parent to the requesting device.

Deferred Contention to Higher Devices

Conventional deployments of the RPL protocol (e.g., according to RFC 6550) can suffer from many hours of delay in initialization of a DAG network topology in LLNs that contain thousands of network devices that are densely deployed in the data network. For example, a smart grid Advanced Metering Infrastructure (AMI) network can utilize a connected grid mesh (CG-Mesh) that comprises a field area router (FAR) and thousands of network devices, where each network device can reach, within its transmission range, hundreds of neighboring network devices.

RFC 6550 permits a network device when powered up to proactively transmit one or more DIS messages to solicit transmission of a DIO message from a neighboring network device, or the powered-up network device can proactively transmit a DIO message specifying itself as a root of a floating DAG: although such proactive operations may appear beneficial in enabling a limited number of powered-up devices to attach to an existing DAG network topology, such operations by a powered-up device can interfere with initialization of the DAG network topology that relies on propagation of DIO messages outward from the DAG root (i.e., root-originated DIO messages), for example in response to initial power-up of all the network devices in the LLN, and/or in response to recovery from a power outage in at least a portion of the LLN. Hence, in the case of initialization of the DAG network topology in response to an initial power-up or power outage recovery, the proactive transmission of DIS messages and/or DIO messages executed concurrently by hundreds or thousands of network devices can dramatically interfere with the reliable propagation of the root-originated DIO messages that are used to initialize the DAG network topology.

In addition, Section 18.2.1.1. of RFC 6550 permits a network device to "stay silent", waiting to receive DIO messages from the DODAG of interest, and not send any multicast DIO messages until the network device (i.e., "new network device") has joined a DODAG. However, even if the new network device has joined a DODAG, the DIO message transmitted by the new network device can still interfere with "higher" network devices that are closer to the DAG root within the DAG topology that are still attempting to transmit their respective DIO messages from "higher" in the DAG topology (i.e., having a lower rank and closer to the DAG root than the new network device); hence, the DIO transmitted by the "new" network device can interfere with the attempted transmission of DIO messages by respective "higher" network devices, resulting in an unbalanced propagation of DIO messages throughout the LLN network. Such unbalanced propagation of DIO messages can result in "churn", where network devices repeatedly change their preferred parent from a "lower" network device (having a higher rank and further from the DAG root) to a "higher" network device (having a lower rank and closer to the DAG root) as the DIO messages are propagated by the "higher" network devices. The resulting "churn" can cause oscillation in the propagation of DIO messages and can trigger network reformation for child nodes affected by the oscillation, resulting in substantially long delays (hours long) before the DAG topology can converge to a stable topology.

According to example embodiments, messages originated by a DAG root (e.g., root-originated DIO messages) can be evenly and reliably propagated throughout the data network, without interference by "lower" network devices, based on the "lower" network devices in the data network deferring to "higher" network devices (e.g., potential parent devices during initialization of a DAG network topology) in a data network. The deferring by the lower network devices guarantees that higher network devices closer to the DAG root can first attempt transmission of messages (e.g., DIS messages) before any "lower" network device attempts to transmit its own updated message (e.g., an updated DIS message) in response to receiving the message from a higher network device.

The example embodiments can ensure that network devices defer to higher network devices operating according to a prescribed transmission operation, for example according to a prescribed discovery operation such as attempted transmission of DIO messages according to the Trickle algorithm per Sec. 8.3 of RFC 6550. The network devices can defer to higher network devices based on setting a corresponding minimum contention interval "I_D" of the deferred transmission operation to be at least twice the selected minimum contention interval "I" used by any of the higher network devices.

The selected minimum contention interval "I" of the prescribed transmission operation can be randomly selected between an identified range that is greater or equal to a prescribed minimum contention interval "I min", and less than or equal to a prescribed maximum contention interval "I max", i.e., "I min≤I≤I max". Hence, the randomized position "t" of the prescribed transmission operation can be randomly selected between a second identified range that is greater or equal to the one-half the selected minimum contention interval "I/2" (where "/" represents a division operation) and less than the prescribed maximum contention interval "I max", i.e., "I/2≤t<I"; hence, even if the selected minimum contention interval "I" equals the prescribed maximum contention interval "I max" (i.e., "I=I max"), the randomized position "t" remains less than the prescribed maximum contention interval "I max" (i.e., "t<I max"); hence, each network device executing the prescribed transmission operation (e.g., Trickle) can select the corresponding randomized position "t" to be before the prescribed maximum contention interval "I max".

Hence, the deferred transmission operation of the example embodiments causes a network device to defer to any potential parent device attempting transmission of a corresponding message according to the prescribed transmission operation, as the minimum contention interval "I_D" of the deferred transmission operation can be set to at least twice the prescribed maximum contention interval "I max" of the prescribed transmission operation, i.e., "I_D≥2*I max", where "*" represents a multiplication operation.

A topological constant "L" also can be used to further refine the deferral of the network devices, relative to the prescribed maximum contention interval duration "I max". A topological constant "L" can be set to a value of one or more, causing each network device to start its deferred transmission operation by setting its corresponding minimum contention interval "I_D" by multiplying the prescribed maximum contention interval "I max" by an exponential multiple ($2^L$) having the topological constant (L) as the exponent, for example "I_D=I max*$2^L$".

Hence, the example embodiments can ensure that the root-originated messages (e.g., DIO messages) can be evenly and reliably propagated throughout the data network, effectively forming concentric "waves" of root-originated messages that are propagated by "rings" of network devices based on their distance (e.g., hop count, rank, etc.) from the root, without any interference by "lower" network devices that are located in "lower" rings. The example embodiments can dramatically reduce the time required to form a DODAG in an LLN in cases where the root-originated messages are routing protocol messages such as DIO messages; the example embodiments also can substantially reduce the time to propagate any root-originated message throughout the DODAG.

FIG. 1A illustrates an example data network 10 comprising multiple network devices 12 configured for establishing a tree-based network topology, for example a Directed Acyclic Graph (DAG) or a Destination Ordered DAG (DODAG), according to an example embodiment. Each of the network devices (e.g., "Root", "A" through "O") 12 can be configured for forming a DAG network topology via wired or wireless data links 14, for example according to RPL as specified in the IETF RFC 6550, including executing a prescribed transmission operation such as the Trickle algorithm according to RFC 6206.

Although only the network devices "Root", "B", and "D", and "J" are labeled with the reference numeral "12" in FIGS.

1A-1E and FIGS. 6A-6G to avoid cluttering in the Figures, it should be apparent that all the network devices "Root" and "A" through "O" are allocated the reference numeral "12" for purposes of the description herein. Further, it should be apparent that all the network devices "Root" and "A" through "O" 12 are configured for establishing wired or wireless data links 14 (illustrated as curved lines radiating from each device 12), even though only the wireless data links for the network devices "Root" and "J" 12 are labeled with the reference numeral "14" to avoid cluttering in the Figures.

Each of the network devices 12 are configured for executing the prescribed transmission operation (e.g., Trickle) for establishing a selected minimum contention interval "I" (16r of FIG. 1) within a range of a prescribed minimum contention interval (e.g., "I min" of RFC 6206) and a prescribed maximum contention interval (e.g., "I max" of RFC 6206), i.e., "I min≤I≤I max"; each of the network devices also can select a randomized position "t" (18r of FIG. 1), i.e., "I/2≤t<I", where the corresponding network device 12 must wait at least the first half of the selected minimum contention interval "I" 16 (illustrated with hashed lines) before attempting transmission at the randomized position "t" 18 within the second half of the selected minimum contention interval "I" 16, and where the corresponding network device 12 can transmit only if its corresponding redundancy counter "c" is less than a prescribed redundancy constant "k", described in RFC 6206.

As illustrated in FIG. 1, the root network device "root" 12 can be configured (e.g., by a network administrator) for identifying itself as the DAG root to initiate transmission of its DIO message 20r (e.g., at time t=t0=0), for example during initialization of the DAG network topology after initial power-up or as part of a recovery operation following a power outage. As described in detail in RFC 6550, the DIO message 20r can specify its identity (e.g., IPv6 address), that the network device 12r transmitting the DIO message 20r is the root of the DAG network topology, and a corresponding rank (e.g., rankRoot=1) of the root network device 12r, where a lower rank value indicates a distance closer to the root network device 12r and a higher rank value indicates a distance further to the root network device 12r.

Each DIO message 20 also can optionally specify a "ring" identifier that specifies a relative position of the transmitting network device 12 within the DAG network topology, hence the DIO message 20r output by the DAG root 12 can specify a ring identifier of "Ring1" to specify that the corresponding DIO message 20r is transmitted by a member of the first logical ring "Ring1" closest to the DAG root device 12. The ring identifier can be prescribed for each network device (e.g., set in each network device 12 by a network administrator), or alternately the non-root network devices "A" through "O" 12 can choose their root identifier based on comparing their relative ranks or rank ranges, described below.

As described in further detail below, each of the network devices "A", "B", and "C" are allocated higher rank values relative to the root (e.g., rankA=140 for network device "A", rankB=130 for network device "B", rankC=180 for network device "C"). Hence, the network devices "A", "B", and "C" receiving the DIO message 20r within the transmission range 22r of the DAG root device 12 each can determine that the received DIO message 20r is from a network device that is "closer" to the DAG root device 12, and in response start a deferred transmission operation (44 of FIG. 3) that defers to any prescribed transmission operation (42 of FIG. 3) by setting a corresponding minimum contention interval "I_D" 24 of the deferred transmission operation (also referred to herein as the "deferred minimum contention interval") to be at least twice the selected minimum contention interval "I" 16 used by any of the higher network devices. Hence any network device 12, in response to detecting a DIO message 20 is received from a higher device that is closer to the DAG root device 12, can start a deferred transmission by setting its corresponding deferred minimum contention interval "I_D" 24 to at least twice the selected minimum contention interval "I" 16, ensuring that the network device 12 does not interfere with an attempted transmission by a higher network device.

Figure 1B:
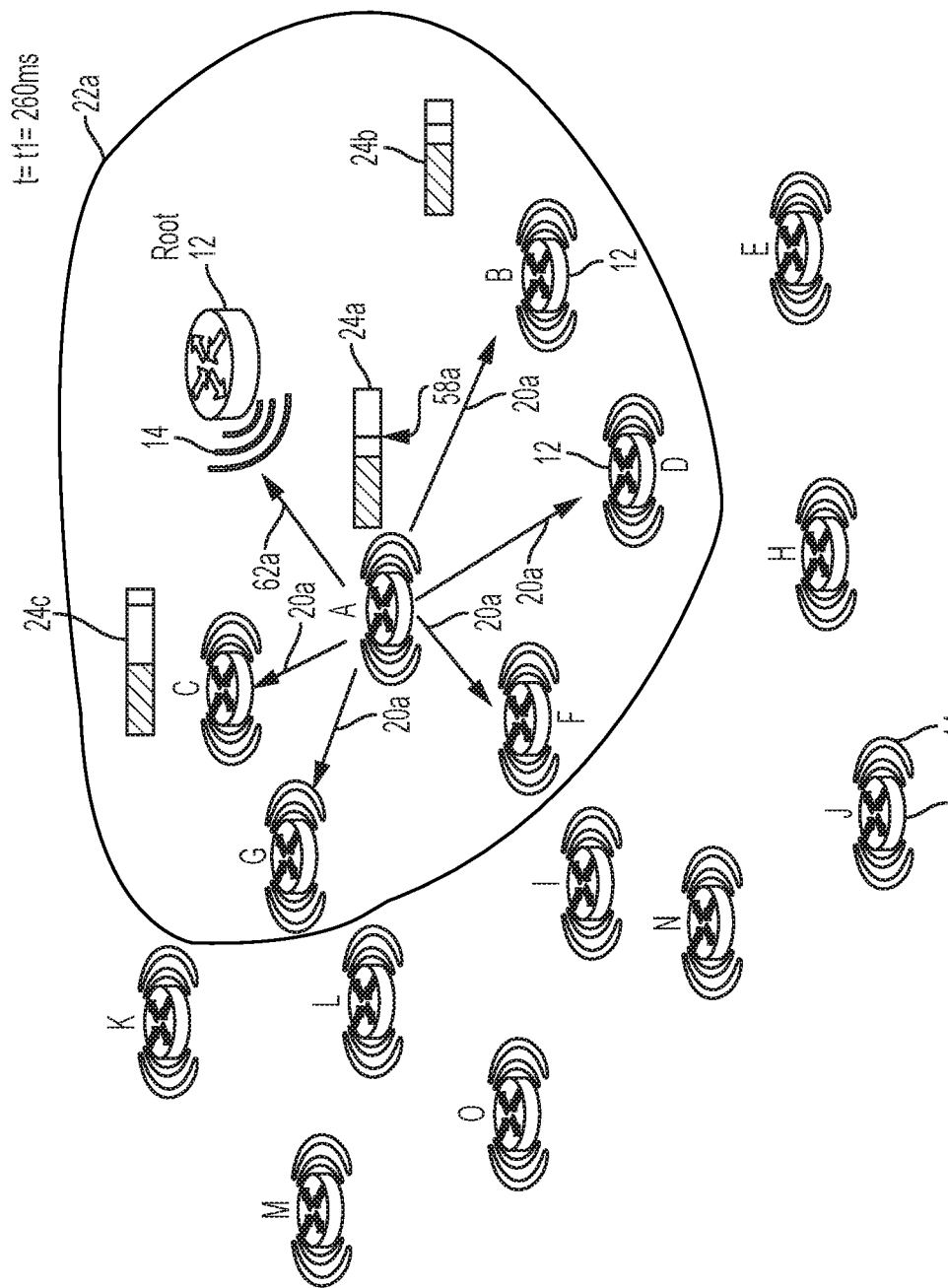
Figure 1C:
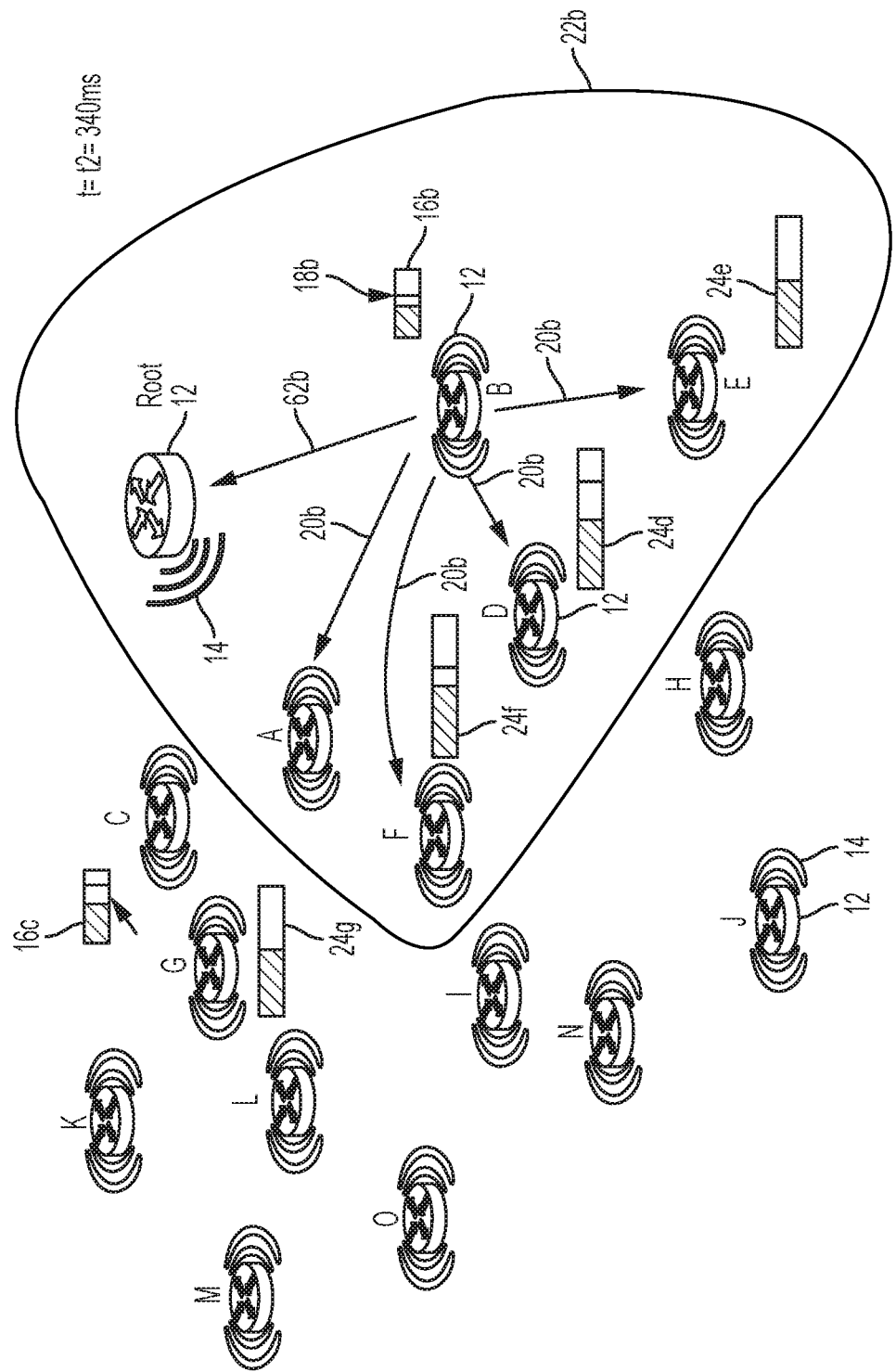
Figure 1D:
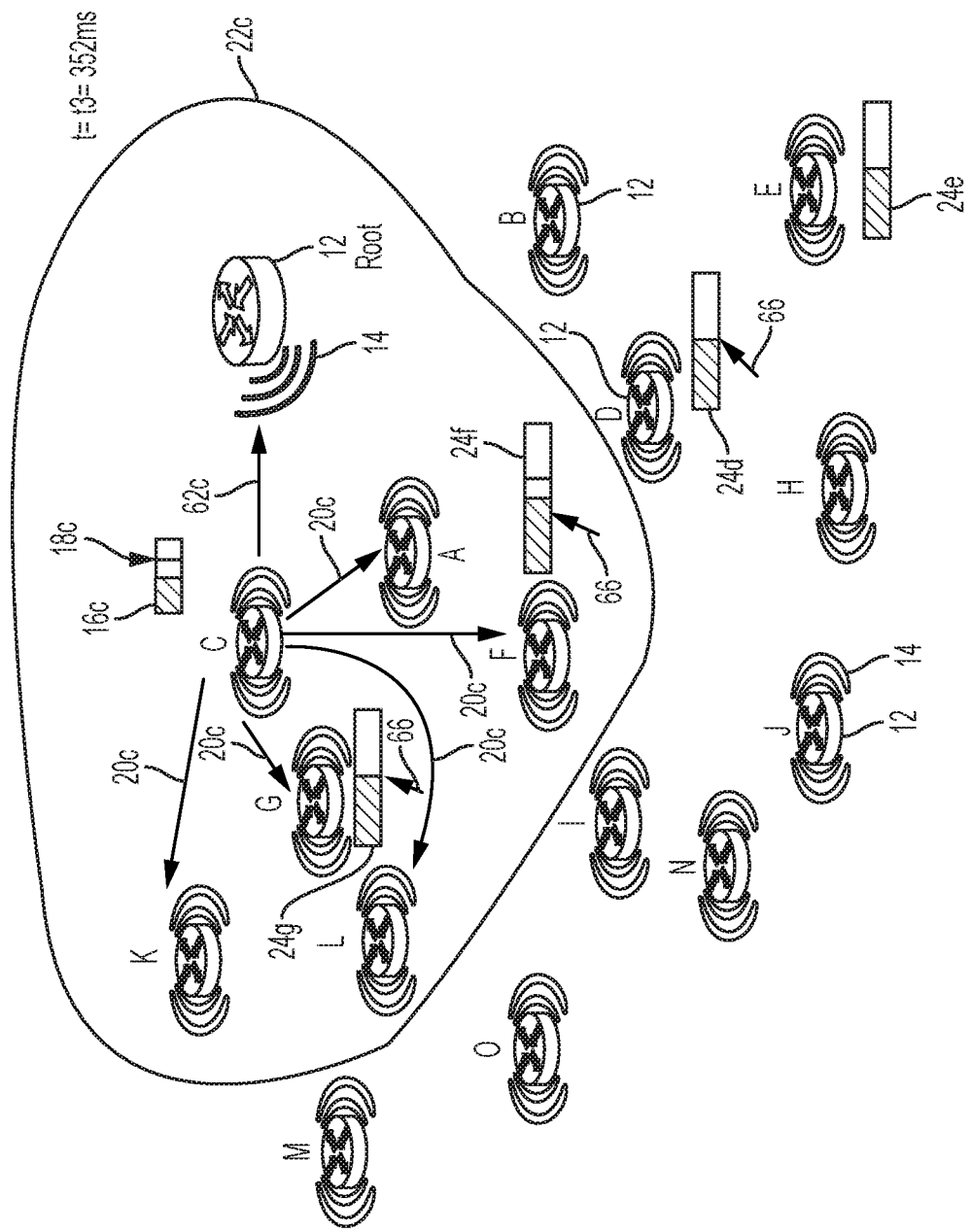
Figure 1E:
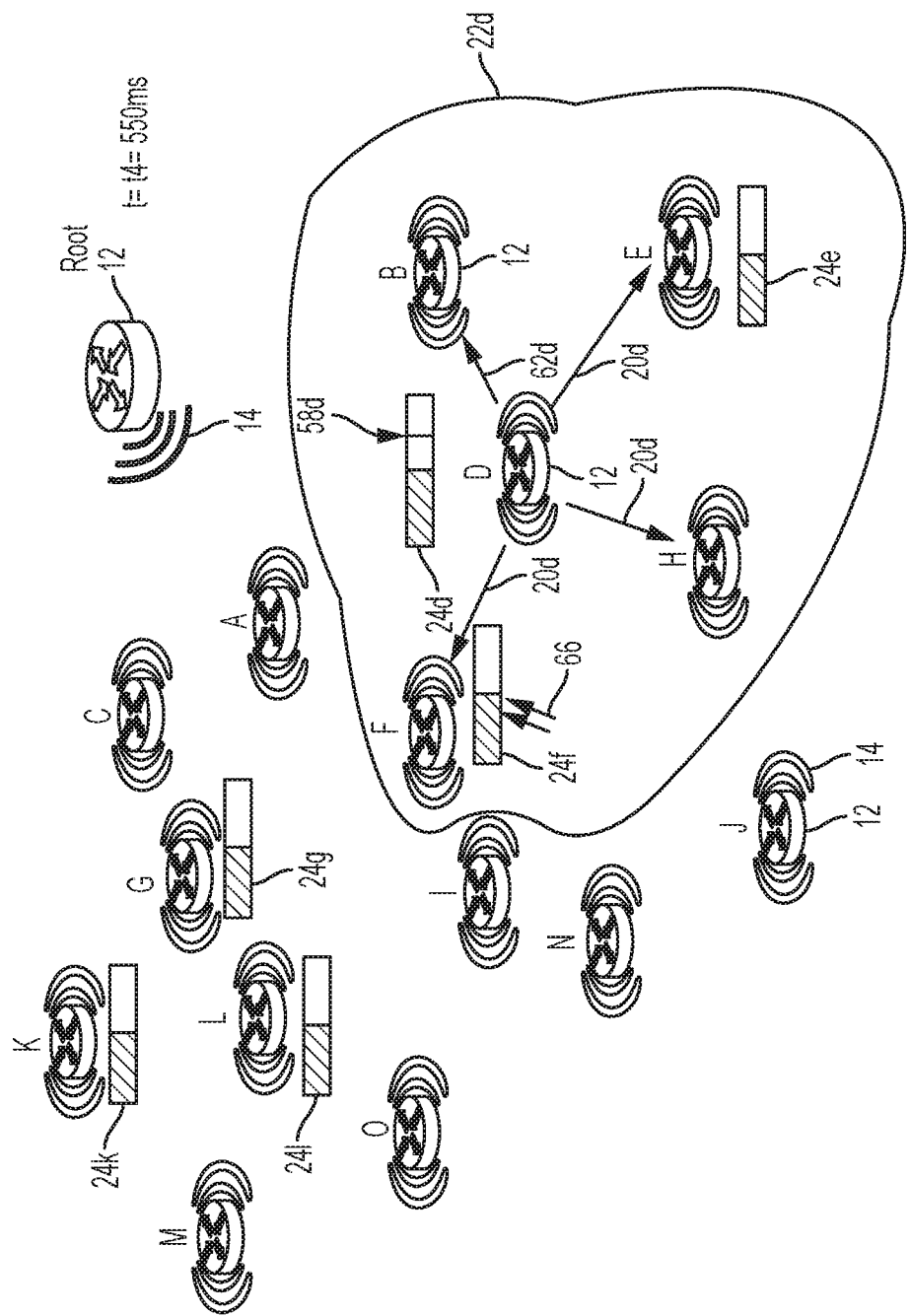
Figure 2:
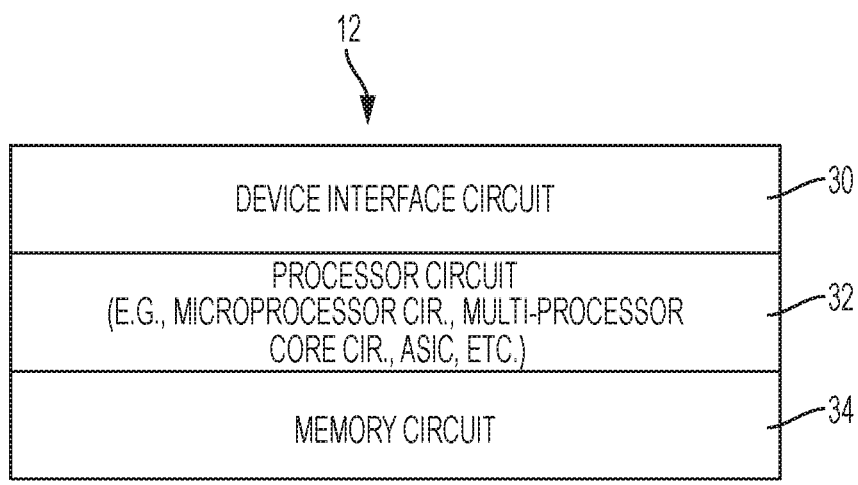
FIG. 2 illustrates an example implementation of any one of the network devices of FIG. 1, according to an example embodiment.

FIG. 2 illustrates an example implementation of any one of the network devices 12 of FIGS. 1A-1E, according to an example embodiment. Each apparatus 12 is a physical machine (i.e., a hardware device) configured for implementing network communications with other physical machines 12 via the data network 10. The term "configured for" or "configured to" as used herein with respect to a specified operation refers to a device and/or machine that is physically constructed and arranged to perform the specified operation.

Each apparatus 12 can include a device interface circuit 30, a processor circuit 32, and a memory circuit 34. The device interface circuit 30 can include one or more distinct physical layer transceivers for communication with any one of the other devices 12; the device interface circuit 30 also can include an IEEE based Ethernet transceiver for communications with the devices of FIG. 1 via any type of data link (e.g., a wired or wireless link, an optical link, etc.). The processor circuit 32 can be configured for executing any of the operations described herein, and the memory circuit 34 can be configured for storing any data or data packets as described herein.

Any of the disclosed circuits of the devices 12 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network device (i.e., network node) via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 3:
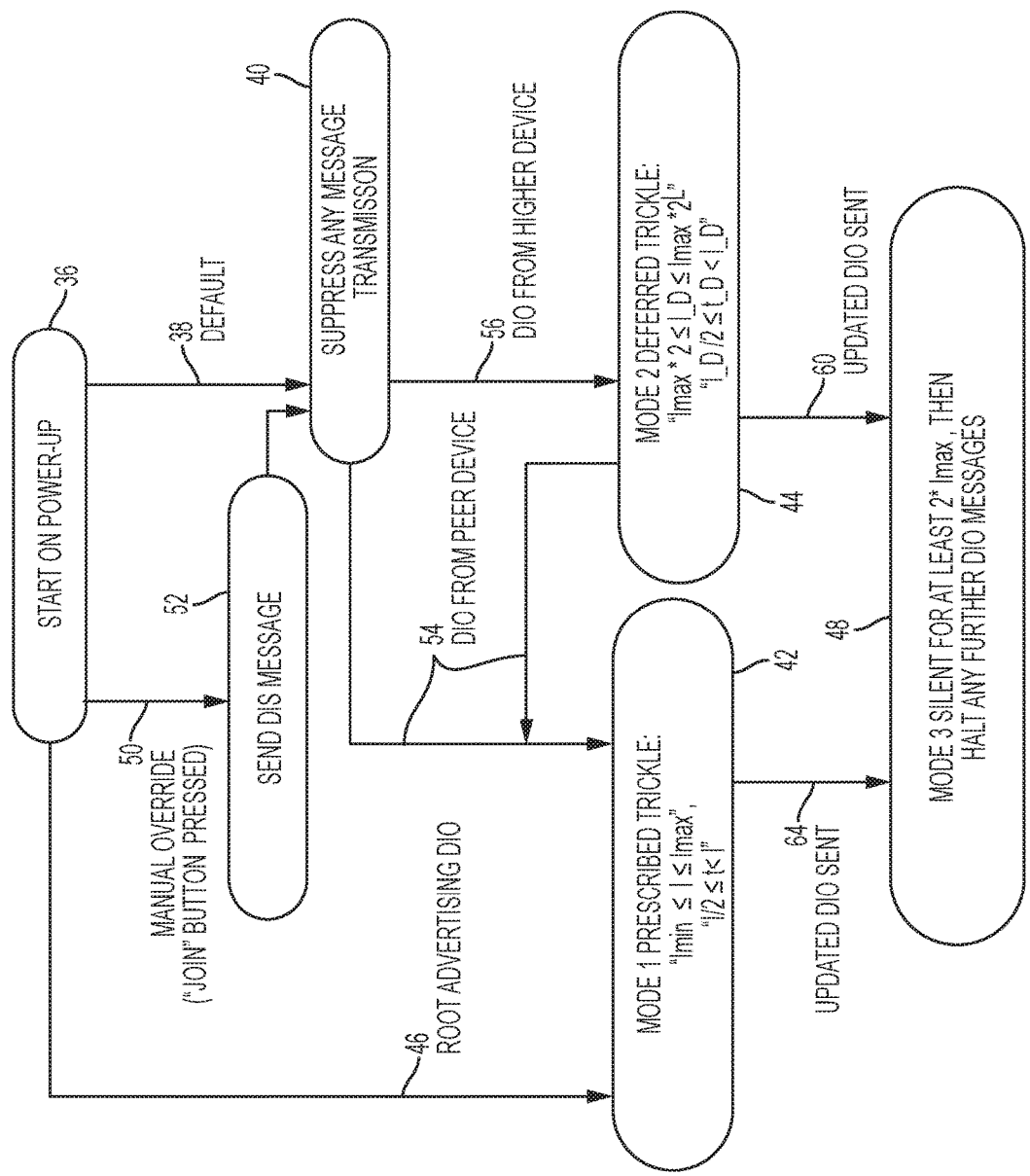
FIG. 3 illustrates an example state diagram executed by the non-root RPL network devices summarizing execution of the deferred transmission operations of FIGS. 1A-1E, according to an example embodiment.
Figure 4A:
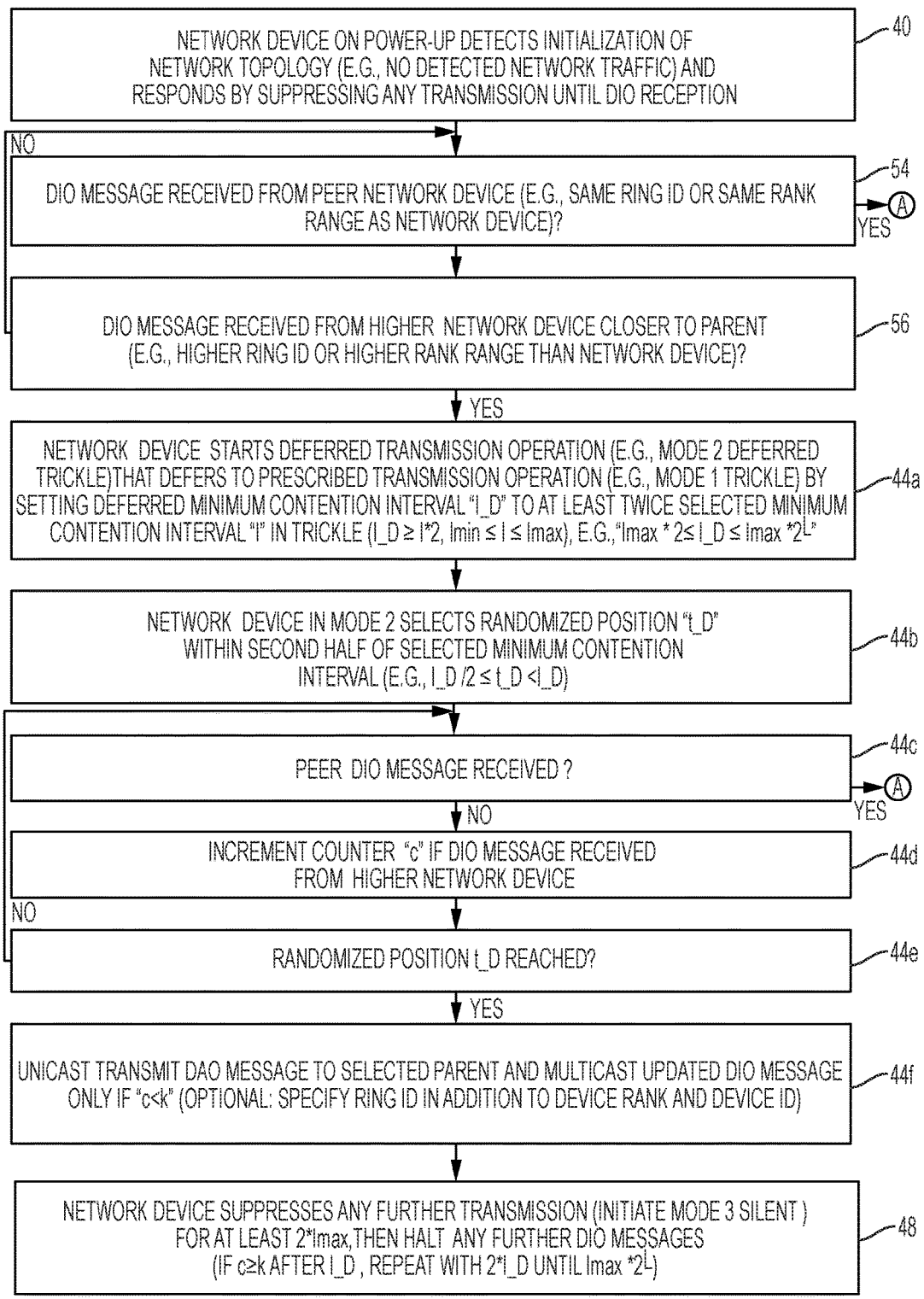
FIGS. 4A and 4B are diagrams illustrating a method of executing the deferred transmission operations of FIGS. 1A-1E, according to an example embodiment.
Figure 4B:
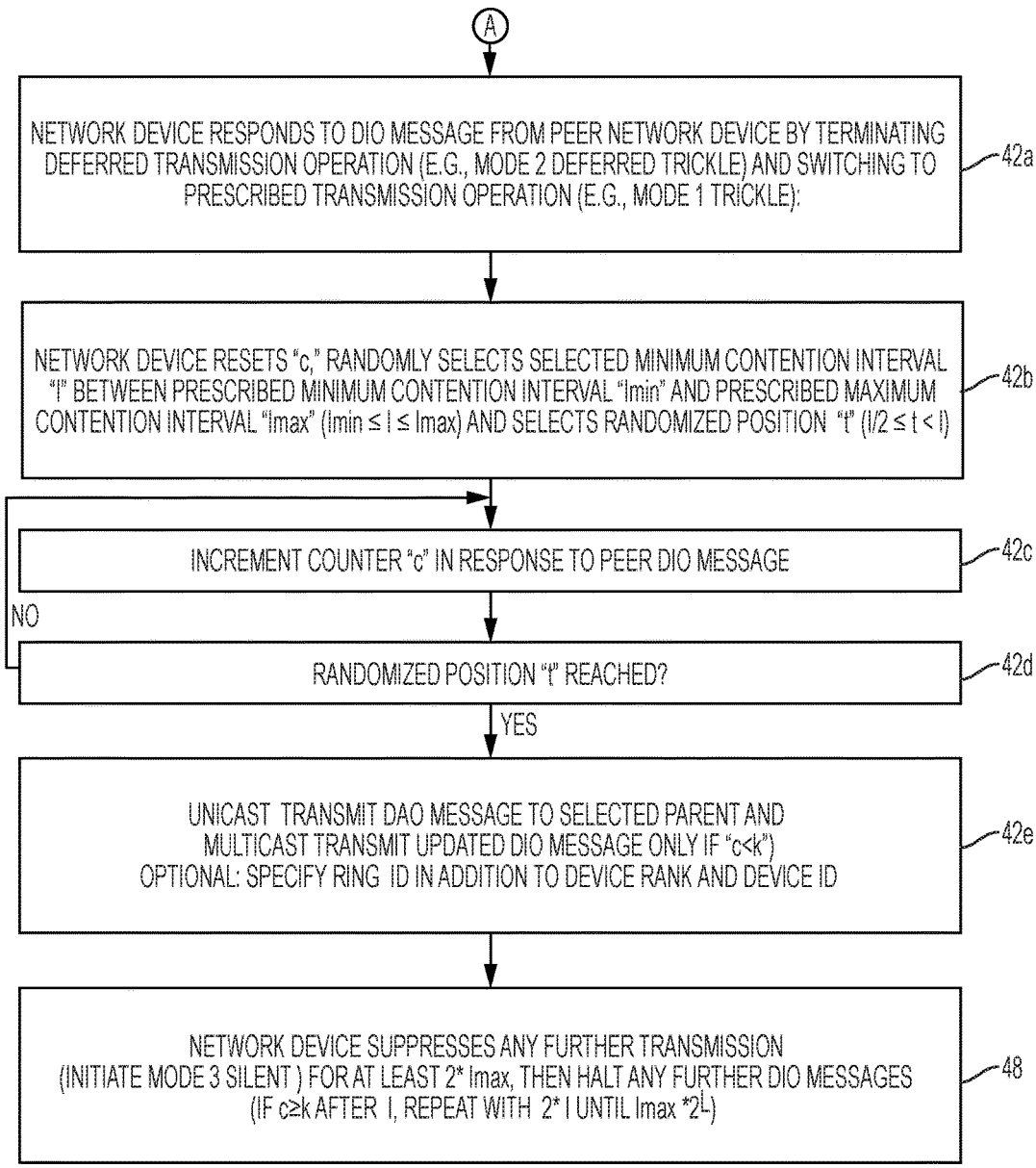

FIG. 3 illustrates an example state diagram executed by the non-root RPL network devices summarizing execution of the deferred transmission operations of FIGS. 1A-1E, according to an example embodiment. FIGS. 4A and 4B are diagrams illustrating a method of executing the deferred transmission operations of FIGS. 1A-1E, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for executing the operations described herein (i.e., the machine becomes configured to execute the operations described herein).

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

In one embodiment, each network device 12 can be configured for storing in its memory circuit 34 prescribed settings for executing the mode 1 (Trickle) operation 42, including the prescribed minimum contention interval "I min" (e.g., "I min=100 ms"), the prescribed maximum contention interval "I max" (e.g., "I max=200 ms), and the prescribed redundancy constant "k" (e.g., "k=2"); each network device 12 also is configured for storing the dynamic variables used during execution of the mode 1 (Trickle) operation 42, including the corresponding selected minimum contention interval "I" 16, the corresponding randomized position "t" 18, and the corresponding counter value "c". The prescribed settings for executing the mode 1 (Trickle) operation 42 can be set, for example, by an administrator or field technician during deployment of the network device 12. Each network device 12 also can be configured for storing in its memory circuit 34 any of the parameters and/or variables associated with the "mode 2" deferred transmission operation 44.

Referring to FIGS. 3 and 4A, each the processor circuit 32 of each network device 12 (except for the DAG root device 12) is configured for responding to a start state 36 upon power-up (e.g., initial power-up upon device activation or power loss recovery) by following a default setting 38 that causes each network device 12 (except for the DAG root device 12) to suppress in operation 40 the transmission of any message in the data network 10 until receiving a prescribed message (e.g., a DIO message 20) from a higher network device, described in detail below. For example, the network device 12 of each non-root network device (e.g., "A" through "O") 12 can detect in operation 40 of FIG. 4A that the DAG topology is under initialization, for example based on a determined absence of any data traffic in the data network 10 for at least a prescribed time interval equal to or longer than the prescribed maximum contention interval "I max", and in response suppress in operation 40 any transmission prior to initiation of any one of the prescribed transmission operation (also referred to as "mode 1", e.g., Trickle according to RFC 6206) 42, or the deferred transmission operation 44 as described herein.

Two exceptions to the non-root default state 38 of entering the non-root suppression state 40 is the DAG root device 12 which can respond to identifying at event 46 that it has a DIO message 20r to transmit by initiating the mode 1 (Trickle) operation 42, and transmitting its DIO message 20r at the selected randomized position "t" 18r, illustrated in FIG. 1A; as described in further detail, the DAG root device 12 can respond to transmission of its DIO message 20r by entering a "mode 3" (i.e., "silent" mode) operation 48 that suppresses any further transmissions for at least twice the maximum prescribed contention interval "I max", followed by suppressing any further transmissions of DIO messages 20r (unless routing operations are required under RFC 6550).

The second exception to the non-root default state 38 of entering the non-root suppression state 40 can be a manual override operation 50, for example an installer pushing a "join" button on a newly-installed network device 12 to cause the newly-installed network device 12 to output in operation 52 a DIS message into an existing DAG topology. However, after the single transmission of the DIS message in operation 52 the newly-installed network device 12 enters the non-root suppression state 40 as described previously.

As illustrated in FIG. 1A, the DAG root device 12 can transmit its DIO message 20r at the randomized position "t" 18r (e.g. at time t=t0=0 coinciding with the randomized position "t" 18r) within the second half of its selected minimum contention interval "I" 16. Each of the non-root network devices "A" through "O" 12 are in the non-root suppression state 40 at time "t=0" associated with the transmission time of the DIO message 20r. Hence, each of the neighboring network devices "A", "B", and "C" 12 within the transmission range 22r of the DAG root device 12 can respond to reception of the DIO message 20 by first determining in operation 54 whether the received DIO message 20 is from a peer network device. Each network device 12 can be configured for storing in its memory circuit 34 its "rank" within the DAG: each network device 12 can decide whether to attach to a potential parent device advertising a DIO message 20 based on whether the corresponding DIO message 20 specifies that the potential parent device has a rank value that is lower than the corresponding rank value stored in the memory circuit 34. A lower rank value indicates a distance closer to the root network device 12r and a higher rank value indicates a distance further to the root network device 12r, hence generally a network device 12 will chose a potential parent device that advertises a lower rank value indicating it is closer to the DAG root device 12.

According to an example embodiment, the DIO message 20r received in operation 54 can optionally specify a ring identifier of "Ring1" to specify that the corresponding DIO message 20r is transmitted by a member of the first logical ring "Ring1" owned by (i.e., closest to) the DAG root device 12. Each of the network devices "A", "B", and "C" 12 can be allocated (e.g., by a network administrator or based on a previously-cached calculation) a ring identifier of "Ring2" that is stored in its corresponding memory circuit 34, indicating that the corresponding network device 12 wants to be a member of a second propagation ring of DIOs initiated by a child of the DAG root device 12; in other words, a first-hop child network device (e.g., "A", "B", and/or "C") of the DAG root device 12 can be considered a child of the first logical ring "Ring1" and a member of a second logical ring "Ring2" in response to receiving the DIO message 20r specifying the first logical ring "Ring1". Hence, any first-hop child (e.g., "A", "B", and/or "C") of the DAG root device 12 stores in its memory circuit 34 a corresponding ring identifier of "Ring2" (as a child of "Ring1"). The ring identifier also enables each network device 12 to determine whether a received DIO message 20 is from advertising network device is a potential parent network device that is closer to the network device 12 (based on the potential parent network device advertising a lower ring identifier), or whether the advertising network device is a peer network device that is at substantially the same depth in the DAG (based on the advertising network device specifying the same ring identifier as stored in the receiving network device).

In an alternate embodiment, since each of the network devices are allocated rank values, the processor circuit 32 of each network device 12 receiving a DIO message 20 can determine the relative "ring" position based on associating the rank advertised in the received DIO message 20 with one of a peer class of network devices or a higher class of network devices, where the higher class includes a first prescribed range values (e.g., "Ring1" class for rank range 1-100), and the peer class includes a second prescribed range of rank values that is increased relative to the first prescribed range (e.g., "Ring2" class for rank range 101-200). For example, the DAG root device 12 can be allocated "Ring1" for rank ranges 1-100, and non-root network devices can be allocated any one of "Ring2" for rank ranges 101-200, "Ring3" for rank ranges 201-300, "Ring4" for rank ranges 301-400, etc. As described previously, each of the network devices "A", "B", and "C" are allocated higher rank values relative to the root (e.g., rankA=140 for network device "A", rankB=130 for network device "B", rankC=180 for network device "C").

Hence, the device interface circuit 30 of each of the network devices "A", "B", and "C", within the transmission range 22r of the DAG root device 12, are configured for receiving the DIO message 20r at time "t=1" of FIG. 1A. The processor circuit 32 of each the network devices "A", "B", and "C" can determine in operation 54 that the received DIO message 20r is not from a peer network device in operation 54 (either because the advertised "Ring1" is a lower ring identifier indicating a higher network device than the "Ring2" identifier used by the network devices "A", "B", or C", or because the advertised "rankRoot=1" is in the first prescribed range of "Ring1" which is lower than the second prescribed class range "Ring2" for which the network devices A, B, and C belong).

Hence, processor circuit 32 of each the network devices "A", "B", and "C" can determine in operation 56 that the DIO message 20r is from a network device that is "closer" to the DAG root device 12 (in this case, is from the network device 12 itself). The processor circuit 32 of each the network devices "A", "B", and "C" in operation 44 of FIGS. 3 and 44a of FIG. 4A in response to detecting the DIO message 20 is from a higher network device can start the "mode 2" deferred transmission operation 44 that defers to any prescribed transmission operation (42 of FIG. 3) by setting in operation 44a a corresponding deferred minimum contention interval "I_D" 24 to be at least twice the selected minimum contention interval "I" 16 used by any of the higher network devices. Since the selected minimum contention interval "I" 16 can have a range of "I min≤I≤I max", the deferred minimum contention interval "I_D" 24 can be set to at least twice the prescribed maximum contention interval "I max" ("I_D≥I max*2") to ensure that the network device absolutely defers to any higher network device executing the mode 1 (Trickle) operation 42. The processor circuit 32 of each non-root network device 12 also can be configured for setting a relative maximum deferred contention interval based on a nonzero topological constant "L" set by an administrator, based on the topological characteristics of the data network 10 and/or the DAG that is initialized. For example a RPL network formed from a string of lighting elements along a highway can have a one-dimensional (linear) topology, i.e., each network device has no more than one child, hence the chance of interference is minimal such that the topological constant can be set to "L=1", i.e., the deferred minimum contention interval "I_D" 24 can be set at "I_D=2*I max"; in more complex network topologies, e.g., 2-dimensional or 3-dimensional topologies where non-root network devices 12 can have multiple children devices, the topological constant can have a value greater than one, such that the deferred minimum contention interval "I_D" 24 can be chosen by one of the non-root network devices from a range of "I max*2≤I_D≤I max*2$^{L}$".

Hence, the processor circuit 32 of each of the network devices "A", "B", and "C" can respond to the DIO message 20r by selecting in operation 44a a corresponding deferred minimum contention interval "I_D" that is at least twice the prescribed maximum contention interval (e.g., "I max=200 milliseconds (ms)", for example the network device "A" can chose "I_D=400 milliseconds (ms)" 24a, the network device "B" can choose "I_D=600 ms" 24b, and the network device C" can choose "I_D=700 ms" 24c, illustrated in FIG. 1A as starting at time "t=0". The processor circuit 32 of each of the network devices "A", "B", and "C" in operation 44b can select a randomized deferred position "t_D" 58 that is after a first half of the deferred minimum contention interval "I_D" 24 (indicated by the hashed lines) and within a randomized position within the second half of the deferred minimum contention interval "I_D" 24. For example, the processor circuit 32 of the network device "A" can select the randomized deferred position "t_D=260 ms" (58a of FIG. 1B), the processor circuit 32 of the network device "B" can select the randomized deferred position "t_D=450 ms", and the processor circuit 32 of the network device "C" can select the randomized deferred position "t_D=460 ms".

Hence, the network device "A" in the deferred transmission operation (mode 2) 44 at the randomized deferred position "t_D=260 ms" 58a after time "t=0" (i.e., receiving the DIO message 20r at time "t=0" in FIG. 1A) in operation 44e can determine that it has not received any other "peer DIO message" (i.e., a DIO message 20 from a peer network device as described with respect to operation 54) in operation 44c, it has not needed to increment its counter "c" in operation 55d in response to receiving another DIO message 20 from a "Ring1" higher network device. Hence, the processor circuit 32 of the network device "A" 12 can determine in operation 44f that its counter "c=0" is less than the redundancy constant "k=2", and in response the processor circuit 32 of the network device "A" 12 in operation 44f (event 60 of FIG. 3) can transmit its updated DIO message 20a, illustrated in FIG. 1B at time "t=t1=260 ms". The updated DIO message 20a output by the device interface circuit 30 of the network device "A" 12 can specify its device identifier (e.g., "A") the DAG identifier (e.g., identifier of the DAG root device 12), the rank of the transmitting network device "A", and optionally the ring identifier "Ring2". The processor circuit 32 of the network device "A" also can cause the device interface circuit 30 to output a destination advertisement object (DAO) 62a to the DAG root device 12, for example according to RFC 6550.

In response to the network device "A" 12 transmitting its DIO message 20a at event 60 and its DAO message 62a, the processor circuit 32 of the network device "A" 12 executes its mode 3 (silent) operation 48 that causes the network device "A" to suppress any further transmission for at least twice the prescribed maximum contention interval "I max" (e.g., at least 800 ms), with no further transmission of a DIO message 20a.

As illustrated in FIG. 1B, the network devices "B", "C", "D", "F", and "G" 12 receive the DIO message 20a that was transmitted within the transmission range 22a at time "t=t1=260 ms". Each of the network devices "B" and "C" 12, in response to detecting in operation 44c that the DIO message 20a is from a peer network device "A" (either by identifying network device "A" belongs to the same "Ring 2" or the same ring range based on its corresponding rank 140), can respond to event 54 (FIG. 3) by terminating the deferred transmission operation (mode 2) 44 and starting execution of the mode 1 (Trickle) operation 42 of FIG. 3, starting with the operation 42a of FIG. 4B. For example, network device "B" in operation 42b at event "t1=260 ms" can select its selected minimum contention interval "I" 16 as "I=120 ms" 16b, and the network device "C" in operation 42b at event "t1=260 ms" can select its selected minimum contention interval "I" 16 as "I=180 ms" 16c, illustrated in FIG. 1C. The network device "B" in operation 42b at event "t1=260 ms" also can select its randomized position "t" 18 as "t=80" 18b (FIG. 1C), and the network device "C" in operation 42b at event "t1=260 ms" can select its randomized position "t" 18 as "t=92 ms" 18c, illustrated in FIG. 1D. Hence, the network devices "B" and "C" can initiate their respective trickle timers, starting at time "t1=260 ms", and wait until the respective randomized positions of "t=80 ms" 18b and "t=92 ms" 18c.

Assume the network device "D" is allocated the rank "rankD=220" and optionally the ring value "Ring3"; the network device "E" is allocated the rank "rankE=275" and optionally the ring value "Ring3"; the network device "F" is allocated the rank "rankF=225" and optionally the ring value "Ring3"; the network device "G" is allocated the rank "rankG=210". Hence, in response to the network devices "D", "F", and "G" 12 receiving the DIO message 20a while in their non-root suppression state 40, the processor circuit 32 of each of the network devices "D", "F", and "G" 12 in operation 56 can determine that the DIO message 20a is from a higher network device based on the ring value "Ring2" and/or the advertised rank value "rankA=140" specified in the DIO message 20a. Hence, the processor circuit 32 of each network device "D", "F", and "G" 12 in operation 44 (44a of FIG. 4A) can select its corresponding deferred minimum contention interval "I_D" 24. For example the network device "D" can select the deferred minimum contention interval "I_D" 24 "I_D=500 ms" 24d (FIG. 1C), the network device "F" can select the deferred minimum contention interval "I_D" 24 "I_D=450 ms" 24f (FIG. 1C), and the network device "G" can select the deferred minimum contention interval "I_D" 24 "I_D=700 ms" 24g (FIG. 1C).

The processor circuit 32 of each network device "D", "F", and "G" 12 in operation 44b also can select its corresponding randomized deferred position "t_D" 58, for example the network device "D" can select the randomized deferred position "t_D" 58 "t_D=290 ms" 58d (FIG. 1E), the network device "F" can select the randomized deferred position "t_D" 58 "t_D=250 ms", and the network device "G" can select the randomized deferred position "t_D" 58 "t_D=650 ms".

Hence, at time "t=t1=260 ms", the device "A" completes its transmission of the DAO message 62a and the DIO message 20a and in response to completed transmission starts its trickle timer for the mode 3 (silent) operation 48 of at least "t=800 ms"; the device "B" (in "Ring2") has its trickle timer set for the corresponding randomized position "t=80 ms" 18b (FIG. 1C), the device "C" (in "Ring2") has its trickle timer set for the corresponding randomized position "t=92 ms" 18c (FIG. 1D), the device "D" (in "Ring3") has its trickle timer set for the corresponding randomized deferred position "t=t_D=290 ms" 58d (FIG. 1E), the device "F" (in "Ring3") has its trickle timer set for the corresponding randomized deferred position at "t=t_D=250 ms", and the device "G" (in "Ring3") has its trickle timer set for the corresponding randomized deferred position at "t=t_D=650 ms". Consequently, the network devices "D", "F", and "G" 12 (in "Ring 3") defer to the "higher" network devices "B" and "C" (in "Ring2").

Hence, the network device "B" in FIG. 1C operating in the mode 1 (Trickle) operation 42 can determine that, upon reaching its corresponding randomized position 18b at time "t=t2=340 ms" in operation 42d of FIG. 4B, it has not received any other "peer DIO message" (identifying the same ring identifier "Ring2" or identifying a same rank range "101-200") and therefore has not needed to increment its counter "c" in operation 42c. Hence, the processor circuit 32 of the network device "B" 12 can determine in operation 42e that its counter "c=0" is less than the redundancy constant "k=2", and in response the processor circuit 32 of the network device "B" 12 in operation 42e (event 64 of FIG. 3) can transmit its updated DIO message 20b, illustrated in FIG. 1C at time "t=t2=340 ms". The updated DIO message 20b output by the device interface circuit 30 of the network device "B" 12 can specify its device identifier (e.g., "B") the DAG identifier (e.g., identifier of the DAG root device 12), the rank of the transmitting network device "B" (e.g., rankB=130), and optionally the ring identifier "Ring2". The processor circuit 32 of the network device "B" also can cause the device interface circuit 30 to output a destination advertisement object (DAO) 62*b* to the DAG root device 12, for example according to RFC 6550.

In response to the network device "B" 12 transmitting its updated DIO message 20*b* at event 64 and its DAO message 62*b*, the processor circuit 32 of the network device "B" 12 executes its mode 3 (silent) operation 48 that causes the network device "B" to suppress any further transmission for at least twice the prescribed maximum contention interval "I max", with no further transmission of a DIO message 20*b*.

As illustrated in FIG. 1C, the network devices "A", "D", "E", and "F" 12 receive the updated DIO message 20*b* that was transmitted within the transmission range 22*b* at time "t=t2=340 ms"; however, other network devices including the network devices "C" and "G" 12 do not detect the updated DIO message 20*b* because they are outside the transmission range 22*b*.

The network device "A" 12 remains in its mode 3 (silent) operation 48 in response to reception of the DIO message 20*b*, hence the network device "A" 12 in operation 48 suppresses any transmission in response to reception of the DIO message 20*b* at time "t=t2". The processor circuit 32 of the network device "D" (having rank "rankD=220" and/or allocated to the ring value "Ring3") 12 responds to reception of the DIO message 20*b* during its deferred transmission operation (mode 2) 44 by determining the DIO message 20*b* is from a higher network device "B" (based on the corresponding DIO message 20*b* advertising the rank "rankB=130" and optionally the ring value "Ring2"), and in response incrementing its corresponding counter to "c=1" in operation 44*d* of FIG. 4A (66 of FIG. 1D). The processor circuit 32 of the network device "F" (having rank "rankF=225" and/or allocated to the ring value "Ring3") 12 also responds to reception of the DIO message 20*b* during its deferred transmission operation (mode 2) 44 by determining the DIO message 20*b* is from a higher network device "B" (based on the corresponding DIO message 20*b* advertising the rank "rankB=130" and optionally the ring value "Ring2"), and in response incrementing its corresponding counter to "c=1" in operation 44*d* of FIG. 4A (66 of FIG. 1D).

The network device "E" 12 that is operating in its non-root suppression state 40 at time "t=t2" of FIG. 1C, can respond to detecting the DIO message 20*b* by determining in operation 56 of FIG. 4A that the DIO message 20*b* is from a higher network device based on the advertised rank value "rankB=130" (and optionally the advertised ring value "Ring2") specified in the DIO message 20*b*. Hence, the processor circuit 32 of the network device "E" in operation 44 of FIG. 3 (44*a* of FIG. 4A) can select its corresponding deferred minimum contention interval "I_D" 24, for example the network device "E" can select the deferred minimum contention interval "I_D" 24 "I_D=600 ms" 24*e* (FIG. 1C). The processor circuit 32 of the network device "E" in operation 44*b* also can select its corresponding randomized deferred position "t_D" 58, for example "t_D=550 ms".

Hence, at time "t=t2=340 ms" the device "A" (in "Ring2") has waited 80 ms within its 800 ms mode 3 (silent) operation 48 that started at time "t=t1=260 ms", the device "B" (in "Ring2") completes its transmission of the DAO message 62*b* and the DIO message 20*b* and in response to completed transmission starts its trickle timer for the mode 3 (silent) operation 48 of at least "t=800 ms"; the device "D" (in "Ring3") having operated for 80 ms of its 290 ms deferral in the deferred transmission operation (mode 2) 44 (that started at time "t=t1=260 ms") increments its counter to "c=1", and the device "F" (in "Ring3") having operated for 80 ms of its 250 ms deferral in the deferred transmission operation (mode 2) 44 (that started at time "t=t1=260 ms") increments its counter to "c=1"; and the device "E" (in "Ring3") has its trickle timer set for the corresponding randomized deferred position at "t=t_D=550 ms". Consequently, the network devices "D", "F", "E", and "G" 12 (in "Ring 3") defer to the "higher" network device "C" (in "Ring2") having waited 80 ms within its randomized position "t=92 ms" 18*c* that started at time "t=t1=260 ms".

Hence, the network device "C" in FIG. 1D operating in the mode 1 (Trickle) operation 42 can determine that, upon reaching its corresponding randomized position 18*c* at time "t=t3=352 ms" in operation 42*d* of FIG. 4B, it has not received any other "peer DIO message" (identifying the same ring identifier "Ring2" or identifying a same rank range "101-200") and therefore has not needed to increment its counter "c" in operation 42*c*. Hence, the processor circuit 32 of the network device "C" 12 can determine in operation 42*e* that its counter "c=0" is less than the redundancy constant "k=2", and in response the processor circuit 32 of the network device "C" 12 in operation 42*e* (event 64 of FIG. 3) can transmit its updated DIO message 20*c*, illustrated in FIG. 1C at time "t=t3=352 ms". The updated DIO message 20*c* output by the device interface circuit 30 of the network device "C" 12 can specify its device identifier (e.g., "C") the DAG identifier (e.g., identifier of the DAG root device 12), the rank of the transmitting network device "C" (e.g., rankC=180), and optionally the ring identifier "Ring2". The processor circuit 32 of the network device "C" also can cause the device interface circuit 30 to output a destination advertisement object (DAO) 62*c* to the DAG root device 12, for example according to RFC 6550. Hence, the DAG root network device 12*r* can establish downward routes for reaching the network devices "A", "B", and "C" based on the respective DAO messages 62*a*, 62*b*, and 62*c*.

In response to the network device "C" 12 transmitting its updated DIO message 20*c* at event 64 and its DAO message 62*c*, the processor circuit 32 of the network device "C" 12 executes its mode 3 (silent) operation 48 that causes the network device "C" to suppress any further transmission for at least twice the prescribed maximum contention interval "I max", with no further transmission of a DIO message 20*c*.

As illustrated in FIG. 1D, the network devices "A", "F", "G", "K", and "L" 12 receive the updated DIO message 20*c* that was transmitted within the transmission range 22*c* at time "t=t3=352 ms"; however, other network devices including the network devices "B", "D", and "E" 12 do not detect the updated DIO message 20*b* because they are outside the transmission range 22*c*.

The network device "A" 12 remains in its mode 3 (silent) operation 48 in response to reception of the DIO message 20*c*, hence the network device "A" 12 in operation 48 suppresses any transmission in response to reception of the DIO message 20*b* at time "t=t3". The processor circuit 32 of the network device "F" (having rank "rankF=225" and/or allocated to the ring value "Ring3") 12 responds to reception of the DIO message 20*c* during its corresponding deferred transmission operation (mode 2) 44 by determining the DIO message 20*c* is from a higher network device "C" (based on the corresponding DIO message 20*c* advertising the rank "rankC=180" and optionally the ring value "Ring2"), and in response increments the corresponding counter to "c=2" in operation 44*d* of FIG. 4A (66 of FIG. 1E): as described in FIG. 3 with respect to operation 44 and FIG. 4 with respect to operation 44*f*, since the counter value equals the redundancy constant "c=k=2" the network device "F" is suppressed from any transmissions during its deferred minimum contention interval "I_D" 24f. The processor circuit 32 of the network device "G" the network device "G" (having rank "rankG=210" and/or allocated to the ring value "Ring3") 12 also responds to reception of the DIO message 20c during its deferred transmission operation (mode 2) 44 by determining the DIO message 20c is from a higher network device "C" (based on the corresponding DIO message 20c advertising the rank "rankC=180" and optionally the ring value "Ring2"), and in response incrementing its corresponding counter to "c=1" in operation 44d of FIG. 4A (66 of FIG. 1D).

The network devices "K" and "L" 12 that are operating in their respective non-root suppression states 40 at time "t=t3" of FIG. 1D each can respond to detecting the DIO message 20c by determining in operation 56 of FIG. 4A that the DIO message 20c is from a higher network device based on the advertised rank value "rankC=180" (and optionally the advertised ring value "Ring2") specified in the DIO message 20c. Hence, the corresponding processor circuit 32 of each of the network devices "K" and "L" in operation 44 of FIG. 3 (44a of FIG. 4A) can select its corresponding deferred minimum contention interval "I_D" 24: for example the network device "K" can select the deferred minimum contention interval "I_D" 24 "I_D=600 ms" 24k (FIG. 1E), and in operation 44b can select its corresponding randomized deferred position "t_D" 58, for example "t_D=650 ms"; the network device "L" can select the deferred minimum contention interval "I_D" 24 "I_D=400 ms" 24l (FIG. 1E), and in operation 44b can select its corresponding randomized deferred position "t_D" 58, for example "t_D=250 ms".

Hence, at time "t=t3=352 ms" the device "A" (in "Ring2") has waited 92 ms within its 800 ms mode 3 (silent) operation 48 that started at time "t=t1=260 ms"; the device "B" (in "Ring2") has waited 12 ms within its 800 ms mode 3 (silent) operation 48 that started at time "t=t2=340 ms"; the device "C" (in "Ring2") completes its transmission of the DAO message 62c and the DIO message 20c and in response to completed transmission starts its trickle timer for the mode 3 (silent) operation 48 of at least "t=800 ms"; the device "D" (in "Ring3") having operated for 92 ms of its 290 ms deferral in the deferred transmission operation (mode 2) 44 (that started at time "t=t1=260 ms") maintains its counter at "c=1"; the device "E" (in "Ring3") having operated for 12 ms of its 550 ms deferral in the deferred transmission operation (mode 2) 44 (that started at time=t2=340 ms) maintains its counter at "c=0"; the device "F" (in "Ring3") having operated for 92 ms of its 250 ms deferral in the deferred transmission operation (mode 2) 44 (that started at time "t=t1=260 ms") is suppressed from transmissions during its deferred minimum contention interval "I_D" 24f in response to its counter "c=2" having reached the redundancy constant "k=2"; the network device "G" (in "Ring3") having operated for 92 ms of its 650 ms deferral in the deferred transmission operation (mode 2) 44 (that started at time "t=t1=260 ms") increments its counter to "c=1"; the device "K" (in "Ring3") has its trickle timer set for the corresponding randomized deferred position at "t=t_D=650 ms"; and the device "L" (in "Ring3") has its trickle timer set for the corresponding randomized deferred position at "t=t_D=250 ms".

Consequently, the network devices "A", "B", "C" 12 (in "Ring2") have completed transmission of their respective DIO message 20s and enter the mode 3 (silent) operation 48, enabling the "Ring3" network devices (e.g., "D", "E", "G", "K", and "L") to contend for transmission of the next DIO message 20. As noted previously, the network device "F" is suppressed from any transmission during its corresponding deferred minimum contention interval "I_D" 24f in response to its counter having reached the redundancy constant "c=k=2"; hence, the network device "F" 12 is suppressed from transmission at time "t=510 ms", which is the expiration of its randomized deferred position "t_D=250" that was initiated at time "t=t1=260 ms".

Hence, the network device "D" in FIG. 1E operating in the deferred transmission operation (mode 2) 44 can determine that, upon reaching its corresponding randomized position 58d at time "t=t4=550 ms" in operation 44e, it has not received any other "peer DIO message" (i.e., a DIO message 20 from a peer network device as described with respect to operation 54) in operation 44c, it has incremented its counter "c" to "c=1" in operation 55d in response to receiving the updated DIO message 20b from the "Ring1" higher network device "B". Hence, the processor circuit 32 of the network device "D" 12 can determine in operation 44f that its counter "c=1" is less than the redundancy constant "k=2", and in response the processor circuit 32 of the network device "D" 12 in operation 44f (event 60 of FIG. 3) can transmit its updated DIO message 20d, illustrated in FIG. 1E at time "t=t4=550 ms". The updated DIO message 20d output by the device interface circuit 30 of the network device "D" 12 can specify its device identifier (e.g., "D") the DAG identifier (e.g., identifier of the DAG root device 12), the rank ("rankD=220") of the transmitting network device "D", and optionally the ring identifier "Ring3". The processor circuit 32 of the network device "D" also can cause the device interface circuit 30 to output a destination advertisement object (DAO) 62d to the network device "B" 12, for example according to RFC 6550.

In response to the network device "D" 12 transmitting its DIO message 20d at event 60 and its DAO message 62d, the processor circuit 32 of the network device "D" 12 executes its mode 3 (silent) operation 48 that causes the network device "D" to suppress any further transmission for at least twice the prescribed maximum contention interval "I max" (e.g., at least 800 ms), with no further transmission of a DIO message 20d. As illustrated in FIG. 1E, the network devices "E", "F", and "H" 12 receive the updated DIO message 20b that was transmitted within the transmission range 22d at time "t=t4=550 ms"

The network device "B" 12 remains in its mode 3 (silent) operation 48 in response to reception of the DIO message 20d, hence the network device "B" 12 in operation 48 suppresses any transmission in response to reception of the DIO message 20d at time "t=t4". The processor circuit 32 of each of the network devices "E" and "F" operating in the deferred transmission operation (mode 2) 44 can detect from the received DIO message 20d that the DIO message 20d (specifying rank "rankD=220" and/or allocated to the ring value "Ring3") is from a peer network device "D", for example based on determining the network device "D" belongs to the same "Ring3" or the same rank range (201-300) based on its corresponding rank "rankD=220".

Hence, the processor circuit 32 of each of the network devices "E" and "F" can respond to the DIO message 20d at event 54 (FIG. 3) and operation 44c in operation 4A by terminating the deferred transmission operation (mode 2) 44 and starting execution of the mode 1 (Trickle) operation 42 of FIG. 3, starting with the operation 42a of FIG. 4B. For example, network device "E" in operation 42b at event can select its selected minimum contention interval "I" 16 as "I=150", and the network device "F" in operation 42b can select its selected minimum contention interval "I" 16 as "I=124 ms"; the network device "E" in operation 42b also can select its randomized position "t" 18 as "t=150", and the network device "F" in operation 42b can select its randomized position "t" 18 as "t=80 ms". Hence, the network devices "E" and "F" can initiate their respective trickle timers, starting at time "t4=550 ms", and wait until the respective randomized positions of "t=150 ms" and "t=80 ms" 18c.

Hence, the network devices "E" and "F" of "Ring3" can accelerate their negotiating of their respective DIO messages based on the completion of the "Ring2" propagation by the network devices "A", "B", and "C" 12 that are a single hop from the DAG root device 12, enabling the propagation of the next "ring" of DIO messages via the network devices associated with "Ring3".

The network device "H" 12 operating in its non-root suppression state 40 at time "t=t4" of FIG. 1E can respond to detecting the DIO message 20d by determining in operation 56 of FIG. 4A that the DIO message 20d is from a higher network device based on the advertised rank value "rankD=220" (and optionally the advertised ring value "Ring3") specified in the DIO message 20c, relative to its rank (e.g., "rankH=308") or ring identifier (e.g., network device "H" belongs to "Ring4"). Hence, the corresponding processor circuit 32 of the network device "H" in operation 44 of FIG. 3 (44a of FIG. 4A) can select its corresponding deferred minimum contention interval "I_D" 24, for example "I_D=420 ms", and in operation 44b can select its corresponding randomized deferred position "t_D" 58, for example "t_D=450 ms". Hence, the network device can start its deferred transmission operation (mode 2) 44 by deferring at least "I_D=420 ms" 58 from time "t=t4=550 ms", enabling the network devices "E" and "F" to attempt transmission using the prescribed transmission operation at the randomized positions "t=150 ms" and "t=80 ms" from "t=t4=550 ms", respectively.

Hence any network device 12, in response to detecting a DIO message 20 is received from a higher device that is closer to the DAG root device 12, can start a deferred transmission by setting its corresponding deferred minimum contention interval "I_D" 24 to at least twice the selected minimum contention interval "I" 16, ensuring that the network device 12 does not interfere with an attempted transmission by a higher network device.

Although only a subset of the network devices 12 in the Figures are illustrated as outputting a DIO message 20 to avoid cluttering in the Figures, it should be apparent that all the network devices "A" through "O" 12 can output a corresponding DIO message 20 and a corresponding DAO message.

According to example embodiments, transmission priority is granted by network devices in a directed acyclic graph to "higher" network devices that are closer to a root of the directed acyclic graph. The example embodiments enable the higher network device to obtain prioritized transmission of a data packet, followed by a silent period to minimize interference. The example embodiments also enable network devices to detect when they should begin claiming the higher priority for further transmission of the data packet to other network devices. Hence, the example embodiments a prioritization scheme for concentric transmissions in a data network, based on the relative "depth" of network devices in the network topology.

Synchronizing to Neighbor for Detecting Beacon from Preferred Parent

Figure 5A:
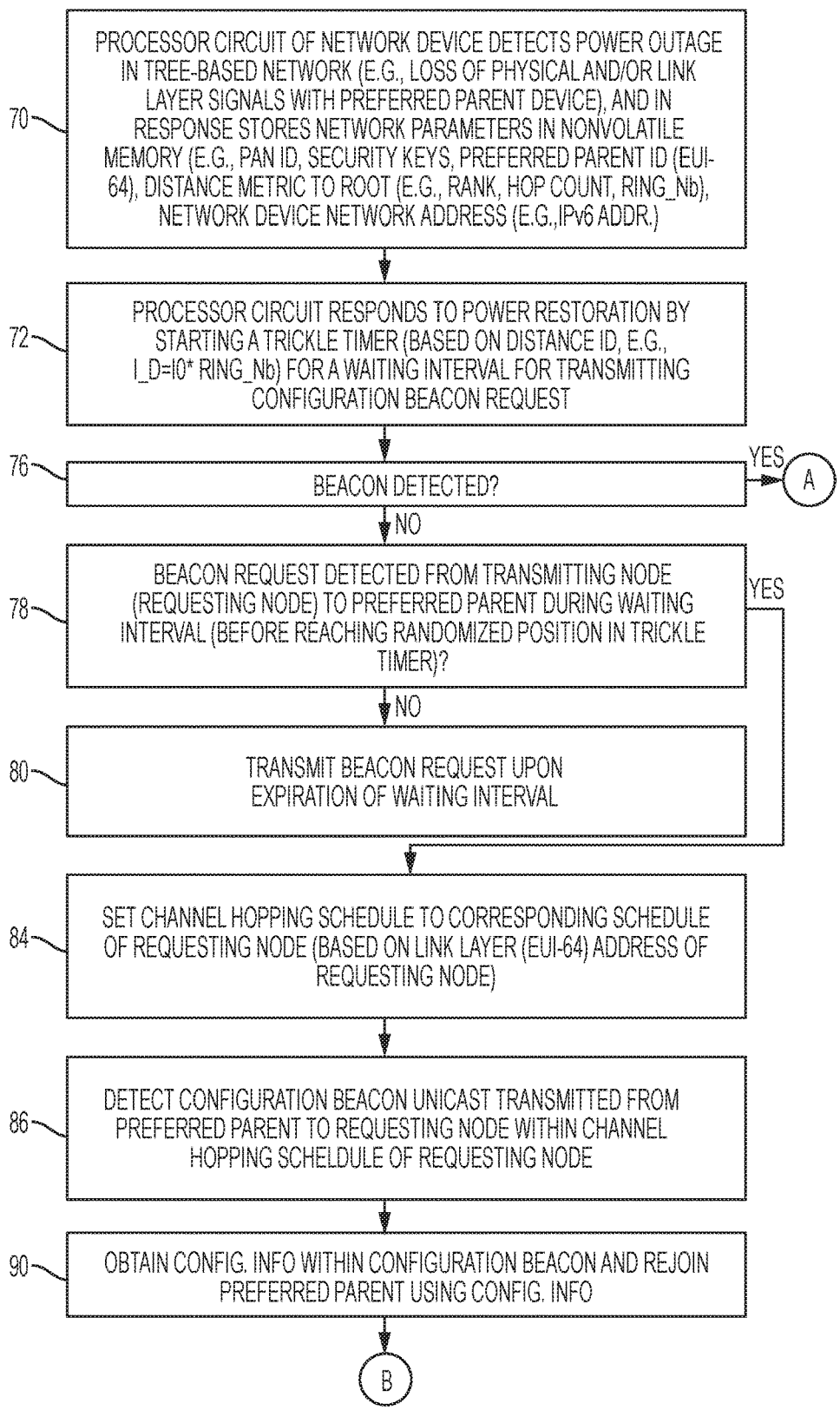
FIGS. 5A and 5B summarize an example method of a non-root network device executing fast reformation based on deferred contention to higher devices in the data network, according to an example embodiment.
Figure 5B:
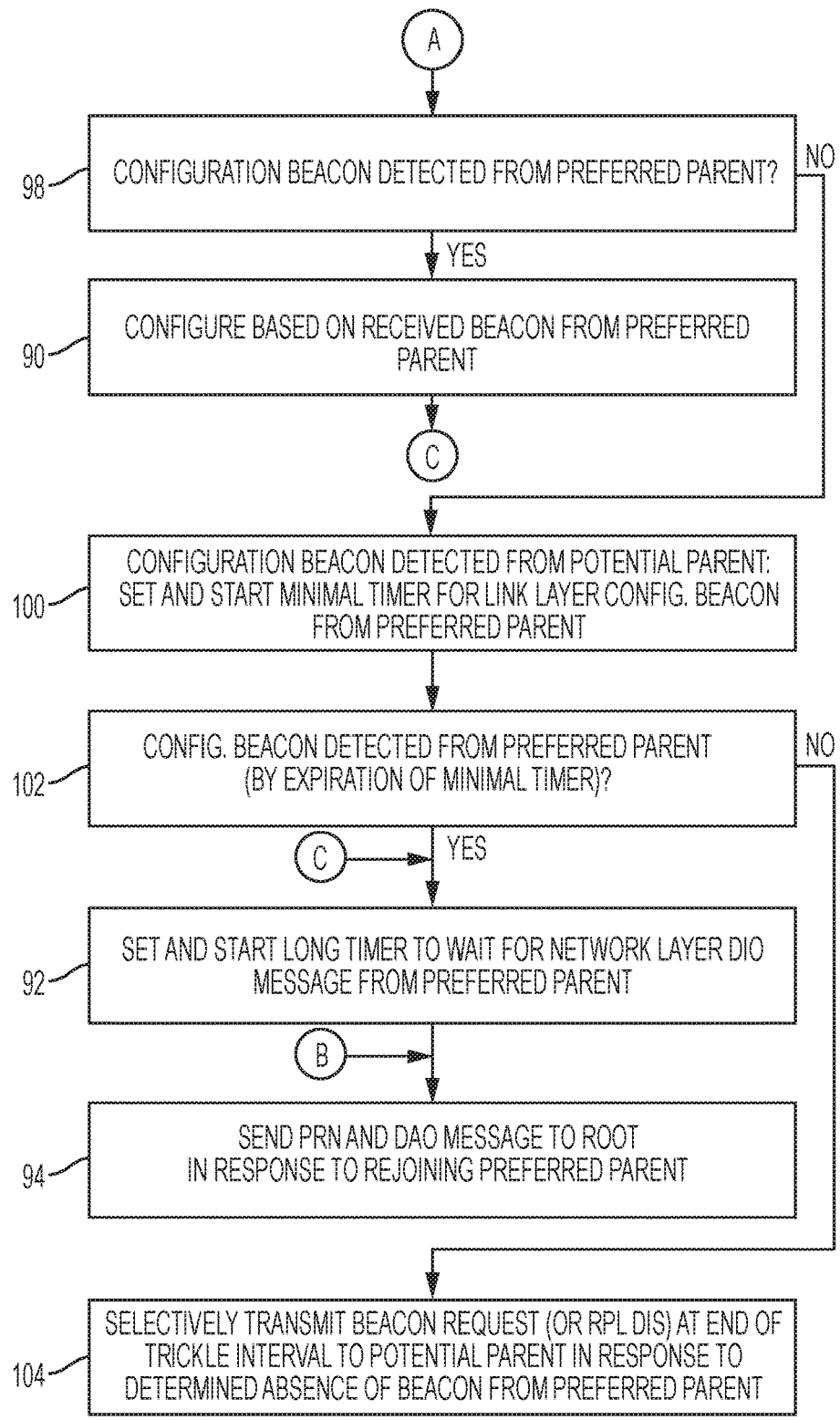

FIGS. 5A and 5B summarize an example method of a non-root network device executing fast reformation based on deferred contention to higher devices in the data network, according to an example embodiment.

FIGS. 6A-6G illustrates an example variation of the data network of FIG. 1A and having RPL network devices for executing fast reformation based on the deferred contention to the higher devices, according to an example embodiment. The network 10 in FIGS. 6A-6G is the same as the data network 10 in FIGS. 1A-1E and has the same network devices 12 and wired and/or wireless data links 14, except the non-root network devices 12 are rearranged (merely by identifiers/locations) to easier illustrate the fast reformation described herein.

As described previously, the operations described with respect to any of the Figures can be implemented as executable code stored on a computer or machine readable non-transitory tangible storage medium, and/or executable logic that is encoded in one or more non-transitory tangible media for execution.

As described previously, example embodiments enable fast reformation following a partial and/or complete power outage in a data network based on a network device synchronizing to the corresponding channel hopping schedule of a neighboring requesting device, and rejoining a preferred parent based on obtaining configuration information having been obtained by detecting a configuration beacon unicast transmitted by the preferred parent to the requesting device. The example embodiments as described herein enable a network device to rejoin with its preferred parent device in the DODAG topology without the necessity of the network device transmitting any messages. The ability of a network device to rejoin with its preferred parent device in response to power restoration in a DODAG topology following a partial or complete power outage in the tree-based DODAG topology can dramatically accelerate the reformation of the entire DODAG topology in cases where the DODAG topology can include thousands of network devices.

In particular, connected grid mesh (CG-Mesh) networks are being deployed for Internet of Things applications, such as smart grid Advanced Metering Infrastructure (AMI) networks. An important application of AMI-based networks is the ability to report Power Outage Notification (PON) messages and Power Restoration Notification (PRN) messages. The timely delivery of PON and PRN messages allows an administrator of a smart utility system to efficiently identify the occurrence of power outages and restoration events, and quickly react to such events in order to optimize utility operations, such as recording the power outage duration for future analysis, providing real-time feedback of the field operations on the smart utility system, etc.

An example smart grid AMI network (e.g., 10 of FIGS. 1A-1E and FIGS. 6A-6G) can contain one Field Area Router (FAR) implemented as root network device (e.g., "Root" of FIGS. 1A-1E and FIGS. 6A-6G) 12 and thousands of nodes 12, and a node may have hundreds of neighboring nodes. Network formation in the data network 10, for example in a CG-Mesh network, can include a network joining process that can include: (1) PAN selection, where a joining node 12 either listens for a discover beacon or sends out a discover beacon request to select a Personal Area Network (PAN); (2) Authentication, where a joining node 12 can perform 802.1x mutual authentication and obtain security keys from the Root and/or a parent network device, or other authentication device; (3) PAN configuration where a joining node 12 either listens for a configuration beacon or sends out configuration beacon request to obtain PAN-wide information, such as broadcast schedule, PAN version; and (4) Routing formation, where a joining node 12 obtains an IPv6 address and advertises it to the FAR Root device to configure a downward route from the FAR root device to the joining node 12.

Although the incremental deployment of individual network devices 12 has minimal impact on the performance of an existing data network 10, a partial or complete power outage in the data network 10 between thousands of nodes 12 can result in substantial delays in network reformation, on the orders of tens of hours: the normal network formation process (network discovery, authentication, network configuration, and routing configuration) of establishing the link layer mesh topology results in substantially long delays in reforming the network. Furthermore, due to the characteristics of LLNs, numerous collisions are encountered if hundreds of nodes 12 power on simultaneously and begin transmitting link layer and/or network layer messages. Hence, in the case of reformation of a link layer mesh topology in response to an initial power-up or power outage recovery, the proactive transmission of link layer messages by hundreds or thousands of network devices can dramatically interfere with the reliable propagation of the link-layer messages extending outward from the root and propagated outward by closer network devices near the root that are used to initialize the link-layer mesh topology of the data network 10.

Hence, according to example embodiments, the above-described deferred contention based on ring identifier can be used to defer transmission of link-layer beacon request messages. Further, a network device can execute fast reformation based on synchronizing to the corresponding channel hopping schedule of a neighboring requesting device, and rejoining a preferred parent based on obtaining configuration information having been obtained by detecting a configuration beacon unicast transmitted by the preferred parent to the requesting device. In particular, channel hopping can be used in LLNs as specified in IEEE 802.15.4. If a node wants to communicate with another node, it needs to know the channel hopping schedule of the peer node. The transmitter-receiver pair must be on the same channel during the packet transmission.

CG-Mesh implements a hybrid channel-hopping approach consisting of three types of communication modes, namely unicast mode, broadcast mode, and async mode. In the unicast mode, a sender transmits packets according to the receiver's unicast schedule, which is derived based on its Eui64 address. As described below, a network device can detect a beacon request transmitted by a neighboring network device to a preferred parent, and in response synchronize to the channel hopping schedule of the neighboring network device in order to acquire and implement the beacon response unicast transmitted from the preferred parent to the neighboring network device, enabling the network device to rejoin the preferred parent without ever needing to transmit any beacon request.

Figure 6A:
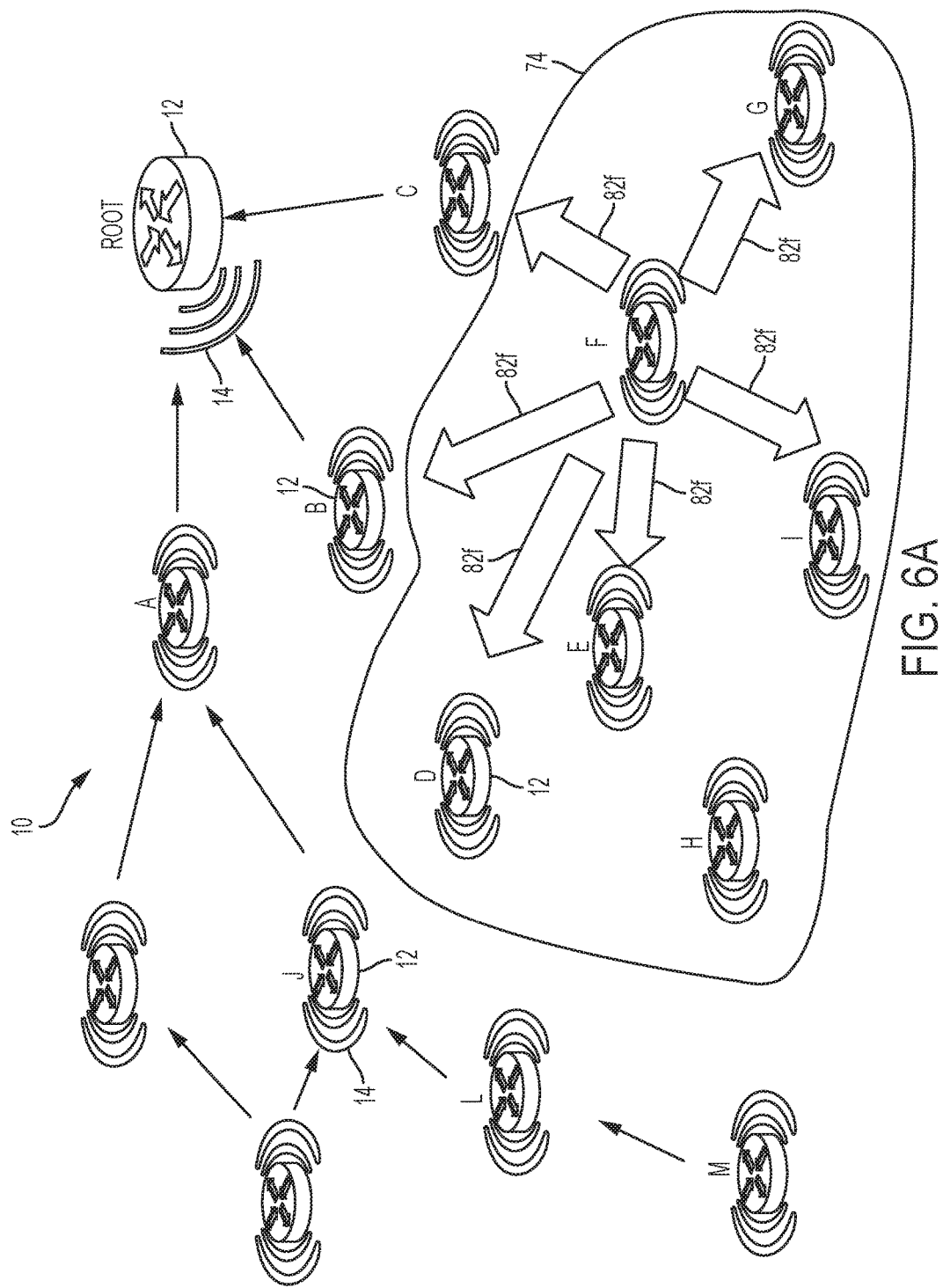

Referring to FIG. 5A, the processor circuit 32 of each non-root network device 12 in FIG. 6A can detect in operation 70 a power outage in the tree-based network 10 of FIG. 6A, for example based on a detected loss of a physical and/or link layer signal with a preferred parent device: in the case the of a wired data link, the detected loss of a physical or link layer signal can be almost immediate, whereas the detected loss of a wireless physical or link layer signal may be based on an absence of any data message from a preferred parent within a prescribed time interval, or a power loss detected by a power supply circuit in the *12 (not shown).

Assume with respect to FIG. 6A that a partial power outage is encountered by the network devices "D", "E", "F", "G", "H", and "I" in the power outage area 74 of FIG. 6A, and that power is maintained in the remaining network devices including the root, devices "A" and "J", etc.

In response to the processor circuit 32 of one of the affected network devices "D", "E", "F", "G", "H", and/or "I" *12 detecting the power outage, the processor circuit 32 is configured for storing, in a nonvolatile memory circuit (e.g., a flash memory in the *34), relevant network parameters used by the *12 for connecting to the preferred parent device 12 according to the link-layer (e.g., CG-Mesh) and network-layer (e.g., RPL) protocols. Example network parameters can include link-layer parameters such as PAN identifier, security keys associated with the link layer connection in the PAN, the link layer address (e.g., EUI-64) of the preferred parent, as well as network-layer parameters such as a distance metric relative to the root network device 12, and the network-layer address (e.g., IPv6 address): as described above, according to an example embodiment the processor circuit 32 of the network device 12 can store its ring identifier "Ring_Nb" as the distance metric; a RPL rank or hop count also can be stored as the distance identifier. By storing the PAN identifier, a network device 12 recovering from the power outage can skip the PAN selection state, eliminating the necessity of the network devices sending and receiving discovery beacons. Storage of security keys also can accelerate link-layer authentication. Storing IPv6 addresses can accelerate routing formation by eliminating the need for a network acquisition process, for example according to Dynamic Host Configuration Protocol (DHCP).

Hence, the processor circuit 32 of the root network device in FIG. 6A in operation 70 can store in its nonvolatile memory circuit that it belongs to "Ring1"; the processor circuit 32 of each network device "A", "B", and "C" in operation 70 can store in its corresponding nonvolatile memory circuit that it belongs to "Ring2"; the processor circuit 32 of each network device "D", "E", "F", and "G" in operation 70 can store in its corresponding nonvolatile memory circuit that it belongs to "Ring2"; the processor circuit 32 of each network device "H", "I", etc. in operation 70 can store in its corresponding nonvolatile memory circuit that it belongs to "Ring3".

The processor circuit 32 of each of the affected neighboring network devices "E", "F", "G" 12 each have stored in operation 70 the network device "C" as their preferred parent, whereas network device "D" has stored the network device "B" as its preferred parent, and network devices "H" and "I" each have stored the network device "E" as its preferred parent.

The network device 12 may optionally enter a sleep state during the power outage.

In response to the processor circuit 32 of the *12 detecting power restoration in the tree-based data network 10, the processor circuit 32 is configured for starting in operation 72 a deferred waiting interval (44 of FIG. 3), described above as the "mode 2 deferred trickle" and also referred to herein as a deferred contention interval 44, based on staring a trickle timer "I_D" having a duration based on the distance identifier, for example, the corresponding ring identifier "Ring_Nb". As described previously, the trickle timer "I_D" of the network device 12 can defer to higher devices based on the distance of the network device to the root: in this example, the processor circuit 32 can set the trickle timer "I_D" to have a value based on an integer multiple of the ring identifier, e.g., "I_D=I0*Ring_Nb", where "I0" can equal the prescribed maximum interval "I max" used by the root network device, ensuring that devices 12 having lower-value ring identifiers can selectively transmit before other network devices 12 having higher-value ring identifiers.

Hence, the root network device (having "Root1") can transmit before any non-root network device, network devices "A", "B", and "C" in "Ring2" can transmit (e.g., a link-layer beacon request) only after the root network device 12, the network devices "D", "E", "F", and "G" in "Ring3" can transmit (e.g., a link-layer beacon request) only after the network devices "A", "B", and "C" in "Ring2", the network devices "H", "I", etc. in "Ring4" can transmit (e.g., a link-layer beacon request) only after the network devices "D", "E", "F", and "G" in "Ring3", etc.

Hence, each of the affected network devices "D", "E", "F", "G", "H", and "I" in FIG. 6A in operation 72 need to wait until expiration of their corresponding waiting interval (at the randomized deferred position "t_D" 58 in the second half of the deferred minimum contention interval "I_D" 24) before attempting any transmission.

The processor circuit 32 of each of the affected network devices "D", "E", "F", "G", "H", and "I" in operation 76 determines during the waiting interval (i.e., before the corresponding randomized deferred position "t_D" 58 in the second half of the deferred minimum contention interval "I_D" 24) whether a configuration beacon is detected, for example from a preferred parent device or a potential parent device, described below. Assuming no configuration beacon is detected (e.g., in async mode as opposed to unicast mode), the processor circuit 32 of each of the affected network devices in operation 78 whether a beacon request from a neighboring transmitting node is detected, described below.

If, upon the expiration of the waiting interval based on the expiration of the trickle timer at the randomized deferred position "t_D" 58, the processor circuit 32 of an affected network device determines that no configuration beacon nor any beacon request has been received, the processor circuit 32 is configured for causing the device interface circuit 30 to transmit in operation 80 a beacon request 82 in async mode: the beacon request 82 (e.g., 82*f* transmitted by the network device "F") specifies the link layer address for the transmitting node "F" (e.g., EUI-64 address for device "F" in a source MAC address field), and the link layer address for its preferred parent "C" (e.g., EUI-64 address for device "C" in a destination MAC address field). As illustrated in FIG. 6A, the network device "F" reaches its randomized deferred position "t_D" 58 before any of the other affected network devices "D", "E", "G", "H", and "I", and transmits in operation 80 its beacon request 82 in async mode. In the async mode, the transmitting network device (e.g., "F") transmits the beacon request 82*f* on all available channels, enabling the neighboring nodes "B", "C", "D", "E", "G", and "I" to receive the beacon request 82*f* regardless of the frequency channel currently in use for listening by the corresponding device interface circuit 30 (note node "H" does not detect the beacon request 82*f* transmitted by the network device "F").

As described previously, the preferred parent for network devices "E" and "G" 12 is the network device "C" as their preferred parent, whereas the preferred parent for network device "D" is the network device "B", and the preferred parent for network devices "H" and "I" is the network device "E". Hence, the processor circuit 32 of the network devices "D", "H", and "I" remains in its waiting interval and discards in operation 78 the received beacon request 82*f* because it identifies a different preferred parent device.

In contrast, the processor circuit 32 of the network devices "E" and "G" respond in operation 78 to determining the destination of the beacon request 82*f* corresponds to their preferred parent "C" by selectively setting in operation 84 its corresponding unicast channel hopping schedule of the device interface circuit 30 to the corresponding unicast channel hopping schedule of the transmitting network device "F". As described previously, the processor circuit 32 of each of the network devices "E" and "G" can determine the channel hopping schedule of the network device "F" based on the link layer address (e.g., EUI-64) of the transmitting network device "F", and in response synchronize the corresponding device interface circuit 30 to match the channel hopping schedule of the network device "F".

Figure 6B:
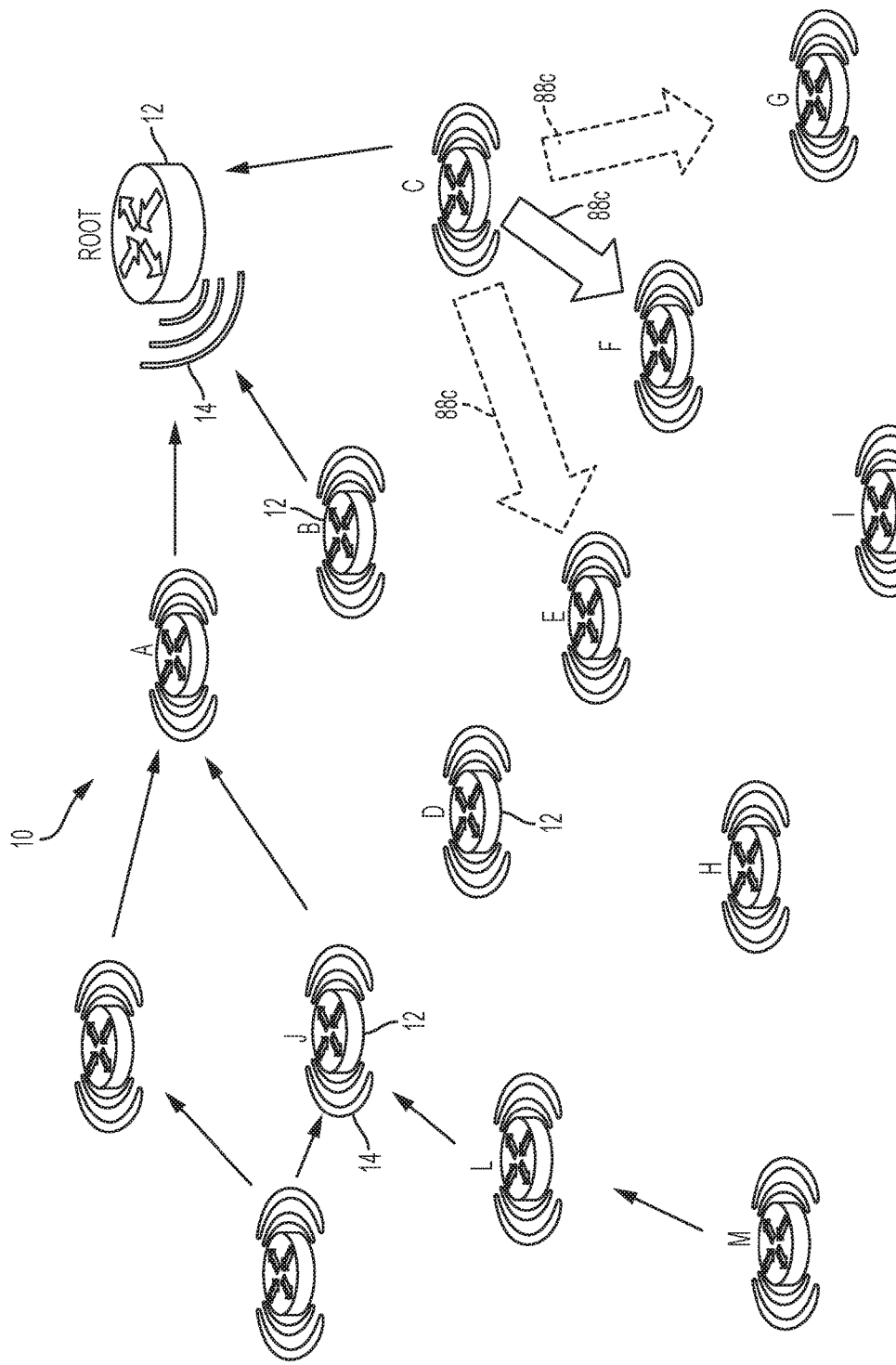

The network device "C", in response to receiving the beacon request 82*f*, can determine its own link layer address (e.g., EUI-64) with the corresponding destination MAC address specified in the beacon request 82*f*: in response to the network device "C" determining that it is the preferred parent network device for the transmitting network device (based on detecting a match with the destination MAC address specified in the beacon request 82*f*), the processor circuit 32 of the network device "C" can respond by unicast transmitting a configuration beacon message 88*c*, illustrated in FIG. 6B, using the channel hopping schedule of the transmitting network device "F" (based on synchronizing relative to the link layer address of the network device "F").

Hence, the device interface circuit 30 of each of the network devices "E", "F", and "G" in operation 86 can detect in FIG. 6B the link-layer configuration beacon message 88*c* that is unicast transmitted by the network device "C" to the requesting network device "F" in response to the beacon request 82*f* from the network device "F". Hence, the processor circuit 32 of each of the network devices "E", "F", and "G" can obtain the configuration information contained within the configuration beacon message 88*c*, and apply the configuration information to rejoin in operation 90 the preferred parent "C" as illustrated in FIG. 6C.

Figure 6C:
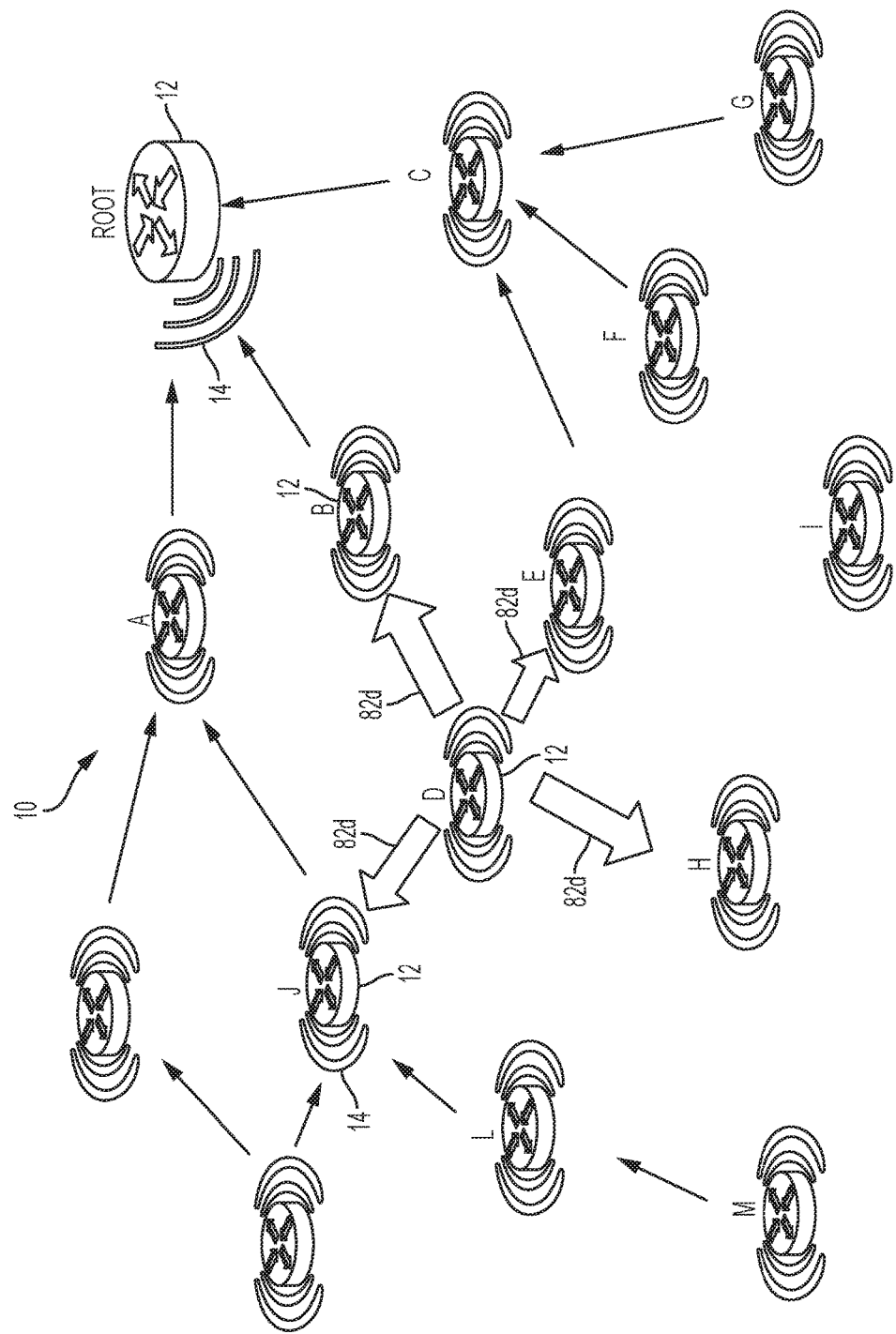
Figure 6D:
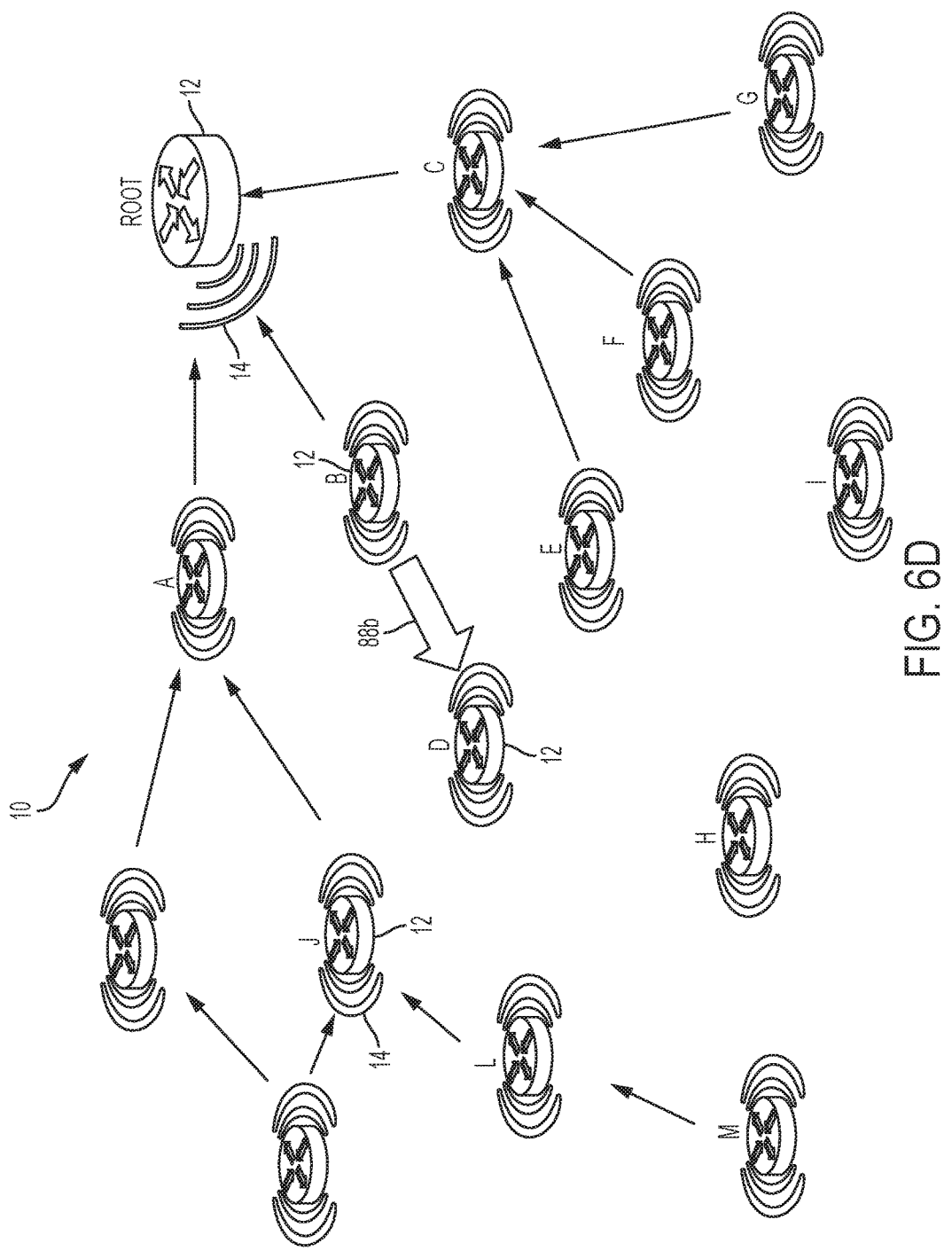

Hence, as illustrated in FIG. 6C the network devices "E" and "G" are able to rejoin their preferred parent device "C" based on the configuration information sent to the transmitting (i.e., requesting) node "F", without needing to transmit any request. As illustrated in FIG. 5B, the processor circuit 32 of each of the network devices "E", "F", and "G" can retrieve their IPv6 addresses from flash memory, and send in operation 94 a PRN message and/or a DAO message to the root network device in response to rejoining the preferred parent "C" in the DAG topology.

Hence, network devices "E", "F", and "G" can obtain the network configuration information through merely a single configuration beacon 82 request in async mode and one configuration beacon message 88*c* in unicast mode. Compared with prior CG-Mesh network deployments that required both requests and beacons to be sent in async modes, the amount of required beacon requests and beacon transmissions are greatly reduced. Furthermore, interference and collisions are substantially minimized, significantly accelerating the reformation process in a dense data network where a parent network node can have has hundreds of child nodes.

As illustrated in FIG. 6C, the network device "D" determines in operations 76 and 78 that it has not detected any configuration beacon message 88 or any beacon request 82 destined for its preferred parent "B". Hence, at the end of its trickle timer the network device "D" at operation 80 can async transmit its beacon request 82*d* specifying its link layer address in the source MAC address field, and the link layer address for its preferred parent "B" in the destination address field. The preferred parent network device "B" in FIG. 6D can respond by unicasting transmitting to the network device "D" a corresponding configuration beacon message 88b, enabling the network device "D" to rejoin the data network 10 in operations 86 and 90. Note that the network device "H" discards the beacon request 82d because the preferred parent for network device "H" is network device "E", not network device "B".

Figure 6E:
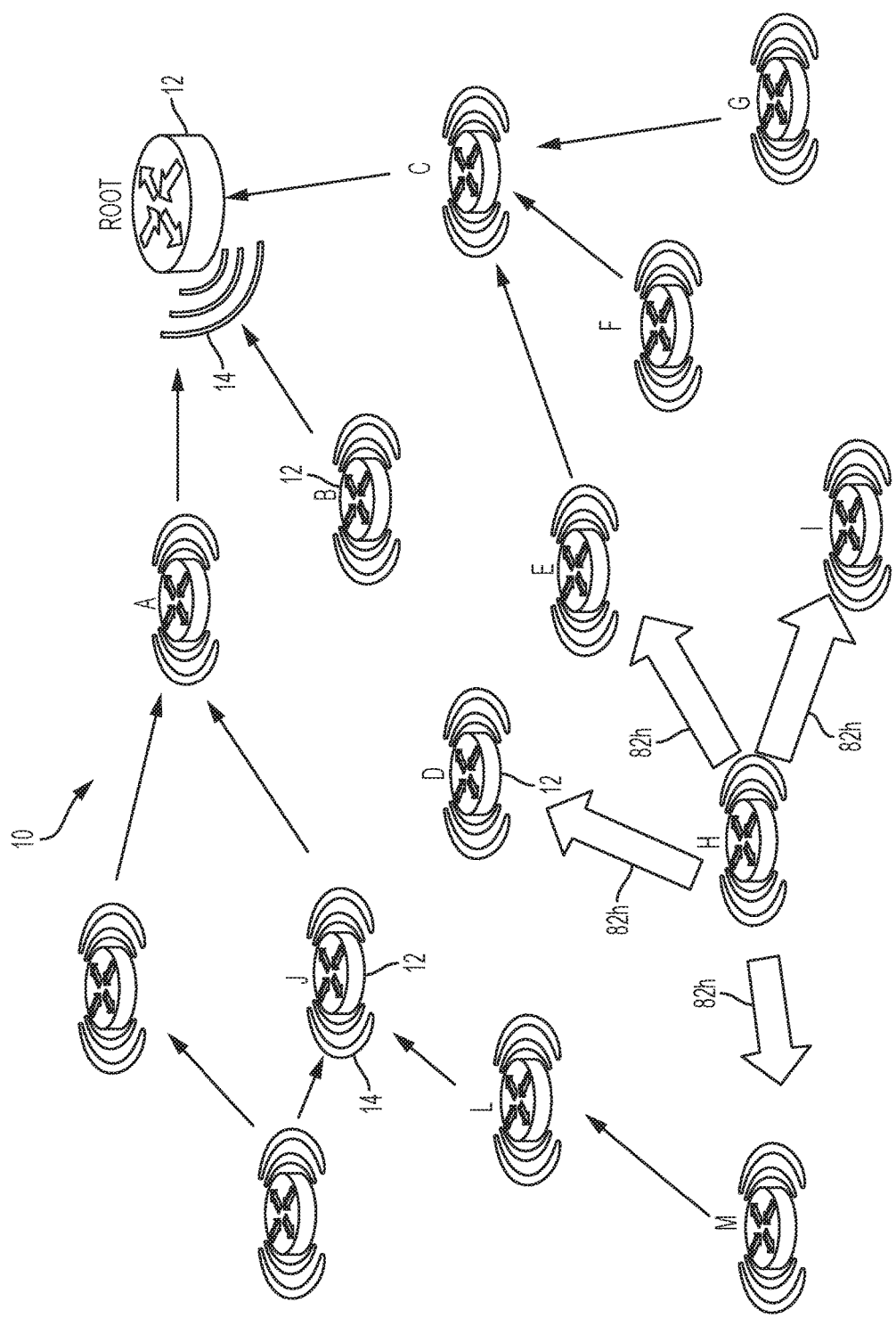

As described previously, the network device "H" (and "I") is in "Ring4" and therefore must defer to the network devices "D", "E", "F", and "G" having shorter trickle timers by setting in operation 72 its trickle timer based on "Ring4", e.g., "I_D=I0*Ring4". As illustrated in FIG. 6E, the network device "H" determines in operations 76 and 78 that it has not detected any configuration beacon message 88 or any beacon request 82 destined for its preferred parent "E". Hence, at the end of its trickle timer (before the corresponding trickle timer of the network device "I"), the network device "H" at operation 80 can async transmit its beacon request 82h specifying its link layer address in the source MAC address field, and the link layer address for its preferred parent "E" in the destination address field.

As described previously with respect to network devices "E" and "G", the network device "I" in operation 78 can determine that the beacon request 82h has a destination address that corresponds to its preferred parent "E". Hence, the network device "I" in operation 84 can set its channel hopping schedule to synchronize with the corresponding channel hopping schedule of the requesting network device "H", based on the link layer address specified in the source MAC address field of the beacon request 82h.

The preferred parent network device "E" in FIG. 6F can respond to the beacon request 82h by unicasting transmitting to the network device "H" a corresponding configuration beacon message 88e, enabling the network device "D" to rejoin the data network 10 in operations 86 and 90. As described previously with respect to network devices "E" and "G", the network device "I" in operation 86 can detect the configuration beacon message 88e, and in response rejoin the data network 10 in operation 90 without ever needing to transmit any link-layer beacon request 82.

Figure 6G:
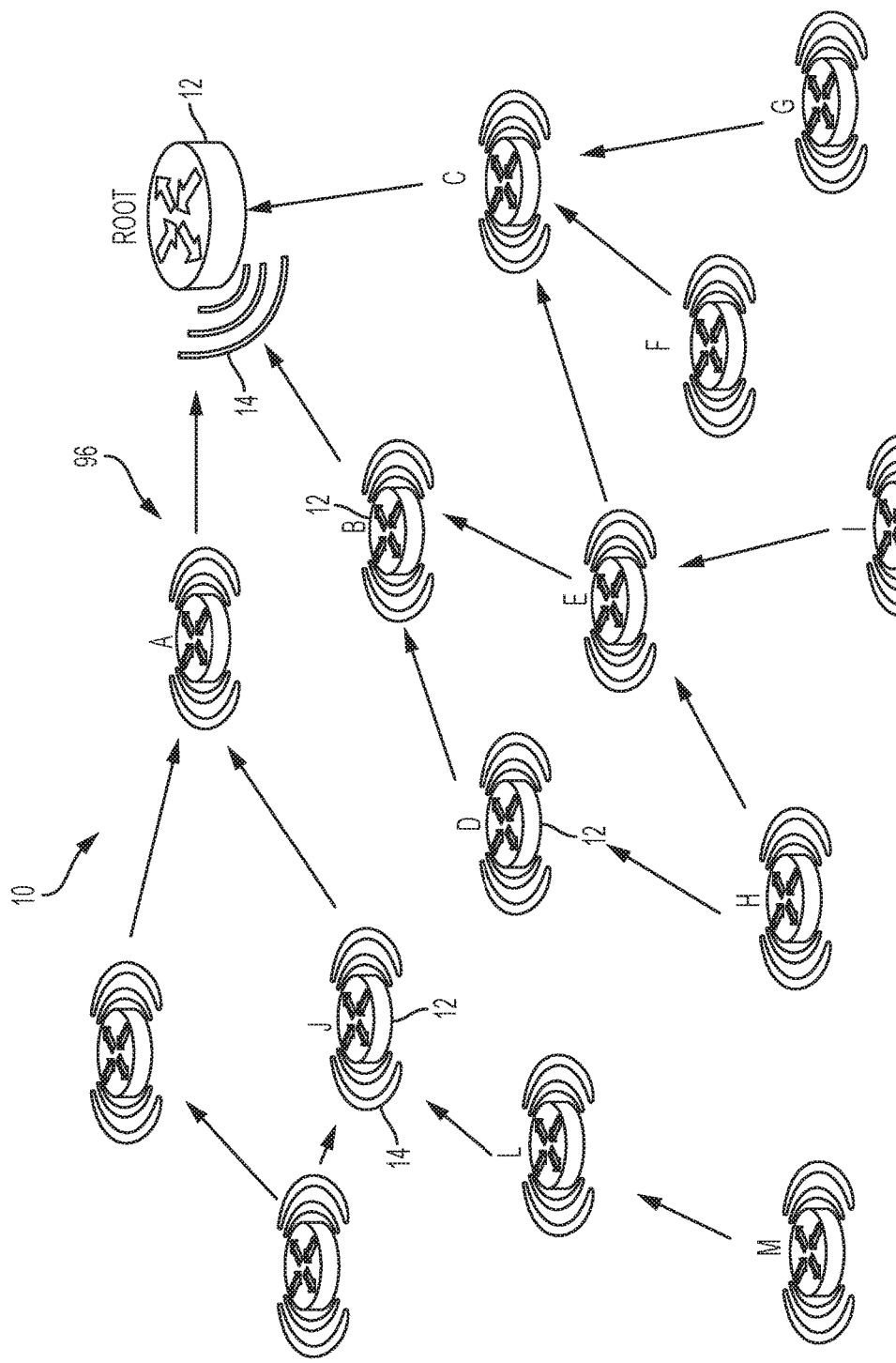

Hence, the example embodiments enable fast reformation of the data network 10 having the tree-based DODAG topology 96 illustrated in FIG. 6G, with minimal transmissions of beacon request messages and configuration beacon messages.

FIG. 5B illustrates a variation that further improves fast reformation in a manner that reduces a possibility that a network device attaches to a parent that is in the same ring. In one example embodiment, assume with respect that the *74 is extended to encompass network devices "B" and "C", such that the affected devices are "B", "C", "D", "E", "F", "G", "H", and "I".

Assume further that nodes with a rank in the range of "0x301" to "0x600" is in a same "Ring2", every node with a rank in the range of "0x601" to "0x900" is in the next "Ring3", etc. In this case, a concern arises that node may end up attaching in a parent that is in the same ring. In particular, network device "H" has a potential parent "M" with a low Rank (e.g., 0x850) and another potential parent "L" with a better Rank (e.g., 0x700). Hence, if the parent devices of network device "H" from before the outage (e.g., preferred parent "D", and alternate parent "E"), are not visible, the network device "H" could infer a Rank from the network device "L", for example an inferred rank of "0x825" that is below the rank of the network device "L". Hence, this could cause network device "H" to place itself in "Ring 3" (according to the inferred rank "0x825"). Further, the network device "I" does not detect any other device and cannot determine its new Rank, and therefore remains quiet.

Consequently, if the network devices "B", "C", "D", "E", "F" and "G" each have a Rank in the Range 0x301→0x600, each would belong to "Ring2". Hence, at the restoration time, each of the network devices "B" and "D" is in listening range from network device "A" (which is in "Ring1" with a Rank below "0x300"), and within listening range of network device "J" which is in Ring 2. Consequently, from those potential parents "A" and "J", both network devices "B" and "D" can form a Rank that is in Ring 2 as well.

According to an example embodiment, the network devices can be configured to improve a probability that the original DODAG topology (illustrated in FIG. 6F) before power loss can be restored. As such, FIG. 5B illustrates how to minimize the possibility that the network device "D" would start its trickle timer based on "Ring2" (instead of "Ring 3") in response to the network device "D" detecting a configuration beacon message 88 or DIO from the network device "J".

In particular, assume that network device in operation 72 starts its trickle timer "I_D" based on its prior stored ring identifier: in response to the network device "D" detecting in operation 76 either a configuration beacon message 88 or a DIO message from a potential parent device "J" (which did not suffer the power outage) 12, the device interface circuit 30 of the network device "D" in operation can determine that the configuration beacon message 88 is not from its preferred parent "B", and in response the processor circuit 32 of the network device "D" can start in operation 100 a minimal timer for waiting for a configuration beacon message 88 from its preferred parent device "B" before joining the potential parent device "J". The minimal timer can have a relatively shorter duration than the deferred trickle timer "I_D", for example "I max".

If in operation 102 the processor circuit 32 of the network device "D" detects a configuration beacon message 88 from its preferred parent device "B", the processor circuit 32 of the network device "D" can set in operation 92 a "long" timer (e.g., 2*I_D) in order to give the preferred parent device "B" sufficient time to reestablish itself as a parent network device in the tree-based topology 96 and transmit a DIO message. Hence, the network device "D" in operation 94 can send its PRN and DAO messages to the root network device 94 after providing sufficient time as set by the "long" timer, or in response to receiving a DIO message from the preferred parent device "B". Note, however, that the network device "D" need not ever transmit any beacon request 82 or any DIS message.

If, however, the processor circuit 32 of the network device "D" determines in operation 102 that a configuration beacon message 88 is not received from the preferred parent "B" upon expiration of the "short" timer, the processor circuit 32 of the network device "D" in operation 104 can cause the device interface circuit 30 to transmit a beacon request 82 (or RPL DIS message) at the end of the trickle interval to the potential parent "J" in response to the determined absence of a configuration beacon message 88 from the preferred parent "D".

As described above, the network device "E" can overhear the exchanges between network devices "D" and "B", and therefore can determine, without sending any messages and without guessing its final Rank, the network device "E" can determine that one of its candidate parents is alive. If the network device "E" in operation 98 detects a configuration beacon message 88 from a candidate that is not a preferred parent, the network device "E" in operation 100 can arm a short time to check if its preferred parent "B" is alive, and in response to detecting the configuration beacon message 88 (directed to the network device "D"), the network device "E" can arm a longer timer in operation 92 waiting for the network device "B" to become a RPL parent. Similarly, the same operations as encountered between network devices "D" and "B" also can occur between network devices "H" and "E", asynchronously. Hence, the network device "H" can refrain from attaching to the neighbor device "L" based on a long timer set in operation 92.

According to example embodiments, a fast network reformation mechanism can reduce the number of async/broadcast beacons, thus mitigating interference and collisions. The fast network reformation optimizes large-scale LLN networks by providing accelerated recovery from large scale power outages.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   storing in a nonvolatile memory, by a network device in response to detecting a power outage in a tree-based network, an identifier for a preferred parent and distance identifier for the network device relative to a root within the tree-based network;
   starting by the network device, in response to power restoration in the tree-based network, a waiting interval for detecting activity associated with the preferred parent, including starting a trickle timer having a duration based on the distance identifier, and determining whether a beacon request from a transmitting node and destined for the preferred parent is detected during the waiting interval;
   in response to the network device detecting the beacon request during the waiting interval:
   selectively setting a channel hopping schedule of the network device to the corresponding channel hopping schedule of the transmitting node in response to determining a destination of the beacon request corresponds to the preferred parent,
   detecting a beacon unicast transmitted from the preferred parent to the transmitting node via the corresponding channel hopping schedule of the transmitting node, the beacon including network configuration information for rejoining the tree-based network following the power restoration, and
   rejoining the preferred parent in the tree-based network based on the configuration information sent to the transmitting node.

2. The method of claim 1, further comprising:
   the network device determining, at expiration of the waiting interval based on the trickle timer, an absence of any beacon request from any transmitting node in the tree-based network; and
   the network device transmitting the beacon request in async mode in response to the determined absence of any beacon request from any transmitting node.

3. The method of claim 1, wherein the starting of the waiting interval includes:
   setting a minimal timer in response to detecting a beacon from a potential parent device different that is different from the preferred parent;
   determining whether the preferred parent is detected by expiration of the minimal timer; and
   transmitting the beacon request in async mode to the potential parent device, at the expiration of the waiting interval, in response to a determined absence of the preferred parent by expiration of the minimal timer, for attachment to the potential parent device.

4. The method of claim 1, wherein the starting of the waiting interval includes:
   setting a minimal timer in response to detecting a beacon from a potential parent device different that is different from the preferred parent;
   determining whether the preferred parent is detected by expiration of the minimal timer; and
   deferring the trickle timer in response to detecting a link layer message transmitted by the preferred parent by expiration of the minimal timer, including setting a preferred-parent deferral timer for waiting for an advertisement message from the preferred parent and that advertises membership in the tree-based network.

5. The method of claim 1, further comprising the network device transmitting a power restoration notification message and a destination advertisement object (DAO) message, specifying the network device is reachable via the preferred parent, to a root of the tree-based topology in response to rejoining the preferred parent.

6. The method of claim 1, wherein the selectively setting includes identifying the channel hopping schedule of the transmitting node based on a link layer address of the transmitting node specified in the received beacon request.

7. The method of claim 1, wherein each of the beacon request and the beacon that is unicast transmitted is a link layer message transmitted via a link layer data link.

8. An apparatus comprising:
   a device interface circuit;
   a nonvolatile memory circuit; and
   a processor circuit configured for storing in the nonvolatile memory circuit, in response to detecting a power outage in a tree-based network, an identifier for a preferred parent and distance identifier for the apparatus relative to a root within the tree-based network;
   the processor circuit configured for starting, in response to power restoration in the tree-based network, a waiting interval for detecting activity associated with the preferred parent, including starting a trickle timer having a duration based on the distance identifier, the processor circuit configured for determining whether a beacon request from a transmitting node and destined for the preferred parent is detected during the waiting interval;
   the processor circuit further configured for responding to detecting the beacon request during the waiting interval by:
   selectively setting a channel hopping schedule of the device interface circuit to the corresponding channel hopping schedule of the transmitting node in response to determining a destination of the beacon request corresponds to the preferred parent,
   determining whether a beacon unicast transmitted from the preferred parent to the transmitting node is detected via the corresponding channel hopping schedule of the transmitting node, the beacon including network configuration information for rejoining the tree-based network following the power restoration, and
   the processor circuit configured for rejoining the preferred parent in the tree-based network based on the configuration information sent to the transmitting node.

9. The apparatus of claim 8, wherein:
the processor circuit is configured for determining, at expiration of the waiting interval based on the trickle timer, whether there is an absence of any beacon request from any transmitting node in the tree-based network;
the processor circuit is configured for causing the device interface circuit to transmit the beacon request in async mode in response to the determined absence of any beacon request from any transmitting node.

10. The apparatus of claim 8, wherein the processor circuit is configured for starting the waiting interval based on:
setting a minimal timer in response to detecting a beacon from a potential parent device different that is different from the preferred parent;
determining whether the preferred parent is detected by expiration of the minimal timer; and
causing the device interface circuit to transmit the beacon request in async mode to the potential parent device, at the expiration of the waiting interval, in response to the processor circuit determining a determined absence of the preferred parent by expiration of the minimal timer, for attachment to the potential parent device.

11. The apparatus of claim 8, wherein the processor circuit is configured for starting the waiting interval based on:
setting a minimal timer in response to detecting a beacon from a potential parent device different that is different from the preferred parent;
determining whether the preferred parent is detected by expiration of the minimal timer; and
the processor circuit deferring the trickle timer in response to detecting a link layer message transmitted by the preferred parent by expiration of the minimal timer, including the processor circuit setting a preferred-parent deferral timer for waiting for an advertisement message from the preferred parent and that advertises membership in the tree-based network.

12. The apparatus of claim 8, wherein the processor circuit is configured for causing the device interface circuit to transmit a power restoration notification message and a destination advertisement object (DAO) message, specifying the apparatus is reachable via the preferred parent, to a root of the tree-based topology in response to rejoining the preferred parent.

13. The apparatus of claim 8, wherein the selectively setting includes the processor circuit identifying the channel hopping schedule of the transmitting node based on a link layer address of the transmitting node specified in the received beacon request.

14. The apparatus of claim 1, wherein each of the beacon request and the beacon that is unicast transmitted is a link layer message transmitted via a link layer data link.

15. One or more non-transitory tangible media encoded with logic for execution by a machine and when executed by the machine operable for:
storing in a nonvolatile memory, by the machine implemented as a network device in a data network, in response to detecting a power outage in a tree-based network, an identifier for a preferred parent and distance identifier for the network device relative to a root within the tree-based network;
starting by the network device, in response to power restoration in the tree-based network, a waiting interval for detecting activity associated with the preferred parent, including starting a trickle timer having a duration based on the distance identifier, and determining whether a beacon request from a transmitting node and destined for the preferred parent is detected during the waiting interval;
in response to the network device detecting the beacon request during the waiting interval:
selectively setting a channel hopping schedule of the network device to the corresponding channel hopping schedule of the transmitting node in response to determining a destination of the beacon request corresponds to the preferred parent,
detecting a beacon unicast transmitted from the preferred parent to the transmitting node via the corresponding channel hopping schedule of the transmitting node, the beacon including network configuration information for rejoining the tree-based network following the power restoration, and
rejoining the preferred parent in the tree-based network based on the configuration information sent to the transmitting node.

16. The one or more non-transitory tangible media of claim 15, further operable for:
the network device determining, at expiration of the waiting interval based on the trickle timer, an absence of any beacon request from any transmitting node in the tree-based network; and
the network device transmitting the beacon request in async mode in response to the determined absence of any beacon request from any transmitting node.

17. The one or more non-transitory tangible media of claim 15, wherein the starting of the waiting interval includes:
setting a minimal timer in response to detecting a beacon from a potential parent device different that is different from the preferred parent;
determining whether the preferred parent is detected by expiration of the minimal timer; and
transmitting the beacon request in async mode to the potential parent device, at the expiration of the waiting interval, in response to a determined absence of the preferred parent by expiration of the minimal timer, for attachment to the potential parent device.

18. The one or more non-transitory tangible media of claim 15, wherein the starting of the waiting interval includes:
setting a minimal timer in response to detecting a beacon from a potential parent device different that is different from the preferred parent;
determining whether the preferred parent is detected by expiration of the minimal timer; and
deferring the trickle timer in response to detecting a link layer message transmitted by the preferred parent by expiration of the minimal timer, including setting a preferred-parent deferral timer for waiting for an advertisement message from the preferred parent and that advertises membership in the tree-based network.

19. The one or more non-transitory tangible media of claim 15, further operable for the network device transmitting a power restoration notification message and a destination advertisement object (DAO) message, specifying the network device is reachable via the preferred parent, to a root of the tree-based topology in response to rejoining the preferred parent.

20. The one or more non-transitory tangible media of claim 15, wherein the selectively setting includes identifying the channel hopping schedule of the transmitting node based on a link layer address of the transmitting node specified in the received beacon request.

* * * * *